(12) United States Patent
Kazdan

(10) Patent No.: US 11,392,202 B1
(45) Date of Patent: *Jul. 19, 2022

(54) WEARABLE TRACKING COMPUTER

(71) Applicant: Dale Kazdan, Seattle, WA (US)

(72) Inventor: Dale Kazdan, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,333

(22) Filed: Jun. 29, 2020

Related U.S. Application Data

(63) Continuation of application No. 16/147,385, filed on Sep. 28, 2018, now Pat. No. 10,739,857.

(60) Provisional application No. 62/660,994, filed on Apr. 21, 2018.

(51) Int. Cl.
| | |
|---|---|
| *G06F 3/01* | (2006.01) |
| *G04G 21/04* | (2013.01) |
| *G06F 1/16* | (2006.01) |

(52) U.S. Cl.
CPC ............. *G06F 3/016* (2013.01); *G04G 21/04* (2013.01); *G06F 1/163* (2013.01); *G06F 3/011* (2013.01)

(58) Field of Classification Search
None
See application file for complete search history.

(56) References Cited

U.S. PATENT DOCUMENTS

| | | | | |
|---|---|---|---|---|
| 2007/0100262 | A1* | 5/2007 | Simos | A61H 23/02 601/79 |
| 2012/0253488 | A1* | 10/2012 | Shaw | G06Q 10/04 700/91 |
| 2014/0208217 | A1* | 7/2014 | Carasso | G06F 16/2477 715/738 |
| 2014/0245161 | A1* | 8/2014 | Yuen | A61B 5/222 715/736 |
| 2014/0265677 | A1* | 9/2014 | Orand | H02K 15/12 264/279 |
| 2014/0278220 | A1* | 9/2014 | Yuen | A61B 5/681 702/150 |
| 2014/0278229 | A1* | 9/2014 | Hong | A61B 5/02433 702/160 |
| 2014/0296655 | A1* | 10/2014 | Akhbardeh | A61B 5/4824 600/301 |
| 2015/0099946 | A1* | 4/2015 | Sahin | A61B 7/04 600/301 |

(Continued)

OTHER PUBLICATIONS

C. Pacchierotti, S. Sinclair, M. Solazzi, A. Frisoli, V. Hayward and D. Prattichizzo, "Wearable Haptic Systems for the Fingertip and the Hand: Taxonomy, Review, and Perspectives," in IEEE Transactions on Haptics, vol. 10, No. 4, pp. 580-600, Oct. 1-Dec. 2017, doi: 10.1109/TOH.2017.2689006. (Year: 2017).*

*Primary Examiner* — William L Bashore
*Assistant Examiner* — Nathan K Shrewsbury
(74) *Attorney, Agent, or Firm* — John J. Bamert, Esq.; Bamert Regan

(57) ABSTRACT

Embodiments are directed to a wearable tracking computer. The wearable tracking computer may include a wearable housing, first and second user input controls, and first and second haptic actuators. The first haptic actuator is preferably configured to haptically stimulate one of a radius bone or an ulna bone of a wearer responsive to actuation of the first user input control. The second haptic actuator is preferably configured haptically stimulate another of the radius bone or the ulna bone of the wearer responsive to actuation of the second user input control.

17 Claims, 15 Drawing Sheets

(56) References Cited

U.S. PATENT DOCUMENTS

| | | | |
|---|---|---|---|
| 2015/0109196 A1* | 4/2015 | Grass | G06F 3/011 |
| | | | 345/156 |
| 2015/0220109 A1* | 8/2015 | von Badinski | A61B 5/021 |
| | | | 368/10 |
| 2015/0277559 A1* | 10/2015 | Vescovi | G06F 3/0416 |
| | | | 345/173 |
| 2016/0019813 A1* | 1/2016 | Mullen | G16H 15/00 |
| | | | 434/236 |
| 2016/0155353 A1* | 6/2016 | Merzenich | G09B 5/06 |
| | | | 434/236 |
| 2016/0165403 A1* | 6/2016 | Turner | H04L 51/046 |
| | | | 455/456.3 |
| 2016/0342207 A1* | 11/2016 | Beran | G06F 3/011 |
| 2017/0366655 A1* | 12/2017 | Thompson | H04L 67/22 |
| 2018/0000685 A1* | 1/2018 | Maloney | A61N 1/36025 |
| 2018/0081438 A1* | 3/2018 | Lehmann | G06F 3/0202 |
| 2018/0108225 A1* | 4/2018 | Mappus | G08B 6/00 |
| 2018/0120892 A1* | 5/2018 | von Badinski | A61B 5/7264 |
| 2018/0196515 A1* | 7/2018 | Appleyard | G06F 3/016 |
| 2018/0259915 A1* | 9/2018 | Hosoi | H04B 1/385 |
| 2019/0155404 A1* | 5/2019 | Cutrell | A63F 13/285 |
| 2019/0167973 A1* | 6/2019 | Pisarev | A61B 5/4519 |
| 2019/0212825 A1* | 7/2019 | Simmons | G06F 3/016 |
| 2019/0222975 A1* | 7/2019 | Panec | H04W 4/80 |
| 2019/0223781 A1* | 7/2019 | Arrington | A61M 21/02 |
| 2019/0324543 A1* | 10/2019 | Kazdan | G04G 7/00 |
| 2021/0008329 A1* | 1/2021 | Sloan | A61M 21/00 |
| 2021/0244992 A1* | 8/2021 | Lear | A63B 21/4043 |

* cited by examiner

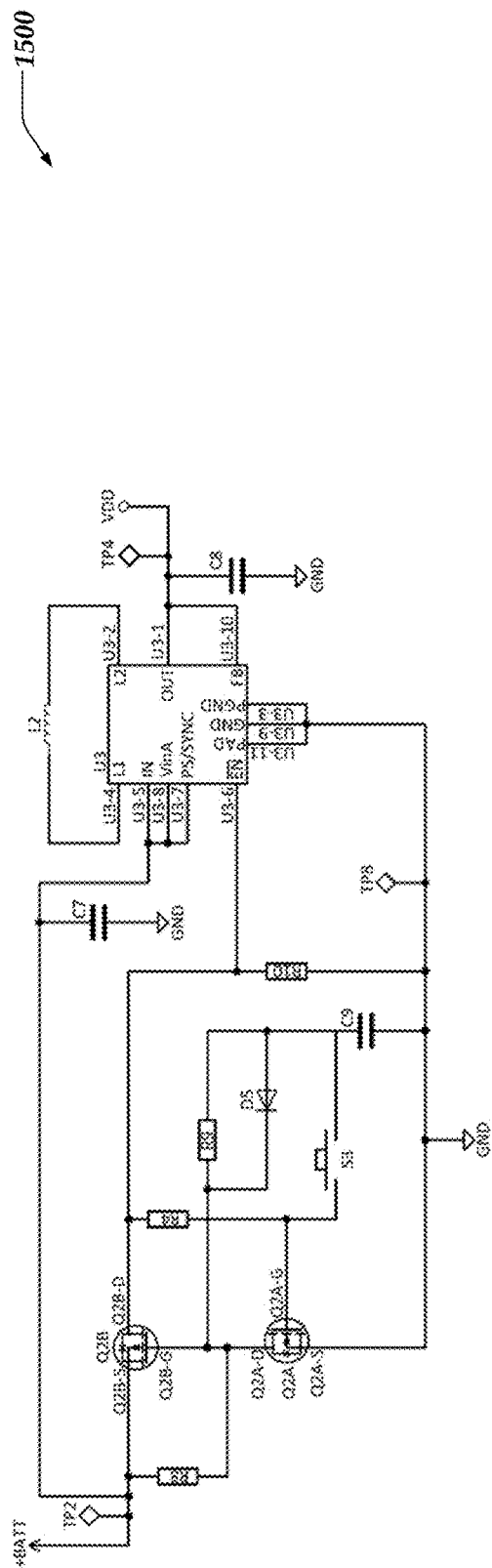
*Fig. 15*
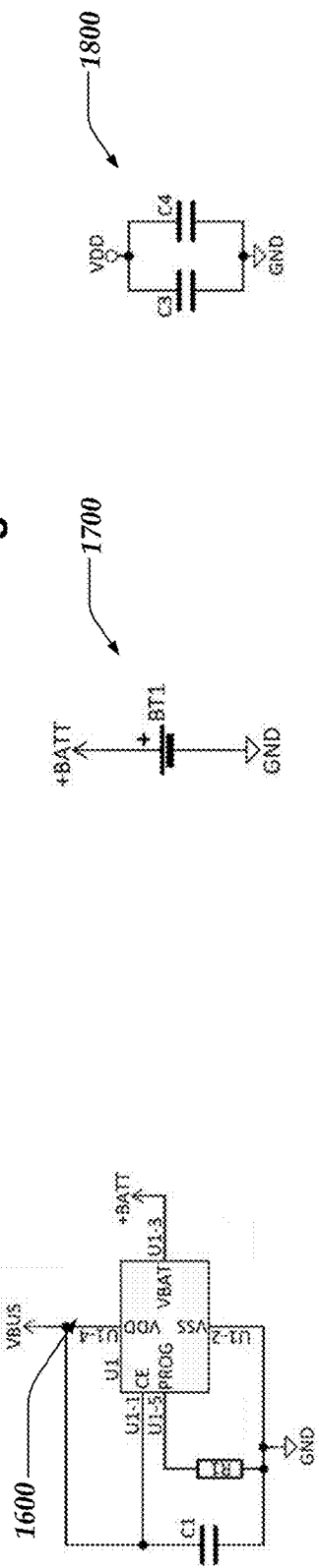
*Fig. 17*
*Fig. 18*
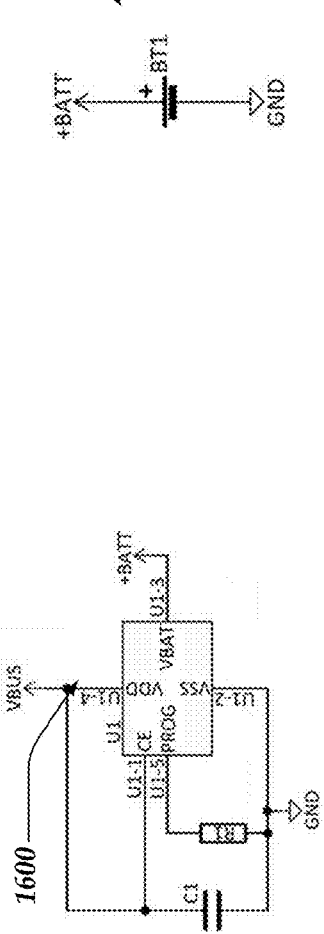
*Fig. 16*

WEARABLE TRACKING COMPUTER

CROSS-REFERENCE TO RELATED APPLICATIONS

This patent application is a continuation of U.S. patent application Ser. No. 16/147,385, entitled "Wearable Tracking Computer," filed on Sep. 28, 2018, which claims priority to U.S. Provisional Application No. 62/660,994, entitled "TimeStamp Wearable," filed on Apr. 21, 2018, the entirety of both which are incorporated herein by reference.

TECHNICAL FIELD

The present invention relates generally to methods and apparatuses for tracking events and, more particularly, yet not exclusively, tracking events by generating timestamp data objects.

BACKGROUND

Tally counter systems that increment counts responsive to user input are typically either mechanical or software implemented on a computer, such as a mobile phone. Mechanical tally counters typically facilitate only a single count to be implemented at once per counter. Moreover, human time and effort is required to record the count, leaving the recorded count susceptible to human error. Software tally counters, such as those available from QTALLY, typically require activating (for example, initiating, switching to, or otherwise selecting) a software tally counter application among many other software applications on a host computer and navigating to an appropriate screen or interface control prior to instructing the software counter to increment a count, rendering a user less likely to use the software counter due to the effort required to increment the count. Moreover, by the time the user gains access to the appropriate screen or interface control, the user often forgets or confounds a motivation for incrementing the count, resulting in the user failing to increment the count or incrementing the wrong count. Therefore, a need exists for a counter system that eliminates the human factor in recording a count and the requirement to navigate through software to an appropriate screen or interface control. Thus, it is with respect to these considerations and others that the present invention has been made.

SUMMARY OF THE INVENTION

The following briefly describes one or more preferred embodiments of the invention to enable a person of ordinary skill to make and use the embodiments of the invention.

Briefly stated, various embodiments are directed to a wearable tracking computer. The wearable tracking computer may include a wearable housing, first and second user input controls disposed in the wearable housing, a processing unit disposed in the housing, and interface circuitry disposed in the wearable housing. The processing unit may be communicably coupled to the first user input control and the second input control. The processing unit may generate a first timestamp data object responsive to actuation of the first user input control and may generate a second timestamp data object responsive to actuation of the second user input control. The first timestamp data object may include information that indicates a logical association with the first user input control, and the second timestamp data object may include information that indicates a logical association with the second user input control. The interface circuitry may provide the first timestamp data object and the second timestamp data object to a client computer.

In some examples, the first user input control is dedicated to initiating generation of timestamp data objects logically associated with the first user input control. Preferably, the second user input control is dedicated to initiating generation of timestamp data objects logically associated with the second user input control.

In some examples, the first timestamp data object includes an identifier that indicates a logical association with the wearable tracking computer. Preferably, the second timestamp data object includes an identifier that indicates a logical association with the wearable tracking computer.

In some examples, the wearable housing is devoid of a liquid crystal display ("LCD").

In some examples, a haptic actuator is disposed in the wearable housing. Preferably, the haptic actuator haptically stimulates a wearer responsive to actuation of the first user input control or to actuation of the second user input control.

In some examples, a first haptic actuator is disposed in the wearable housing under the first user input control. Preferably, the first haptic actuator haptically stimulates a wearer responsive to actuation of the first user input control. In some examples, a second haptic actuator is disposed in the wearable housing under the second user input control. Preferably, the second haptic actuator haptically stimulates the wearer responsive to actuation of the second user input control.

In some examples, a first haptic actuator is disposed in the wearable housing under the first user input control. Preferably, the first haptic actuator haptically stimulates a radius bone or an ulna bone of a wearer responsive to actuation of the first user input control. In some examples, a second haptic actuator is disposed in the wearable housing under the second user input control. Preferably, the second haptic actuator haptically stimulates another of the radius bone or the ulna bone of the wearer responsive to actuation of the second user input control.

Also briefly stated, various embodiments are directed to a method of using the wearable tracking computer. The first user input control may be actuated responsive to an external stimulus. The second user input control may be actuated responsive to an internal stimulus.

In some examples, the first user input control is actuated responsive only to external stimuli.

In some examples, the second user input control is actuated responsive only to internal stimuli.

In some examples, the wearable tracking computer has a first haptic actuator and a second haptic actuator. Preferably, the first haptic actuator is disposed in the wearable housing under the first user input control. In some examples, the first haptic actuator haptically stimulates a radius bone or an ulna bone of a wearer responsive to actuation of the first user input control. Preferably, the second haptic actuator is disposed in the wearable housing under the second user input control. In some examples, the second haptic actuator haptically stimulates another of the radius bone or the ulna bone of the wearer responsive to actuation of the second user input control.

Also briefly stated, various embodiments are directed to a tracking system. The tracking system may include a wearable tracking computer and a timestamp modeling computer. The wearable tracking computer may include a wearable housing, first and second user input controls disposed in the wearable housing, a processing unit disposed in the housing, and interface circuitry disposed in the wearable housing. The processing unit may be communicably coupled to the first user input control and the second input control. The processing unit may generate a first timestamp data object responsive to actuation of the first user input control and may generate a second timestamp data object responsive to actuation of the second user input control. The first timestamp data object may include information that indicates a logical association with the first user input control, and the second timestamp data object may include information that indicates a logical association with the second user input control. The interface circuitry may provide one or more of the first or second timestamp data objects to a client computer. The timestamp modeling computer may obtain one or more of the first or second timestamp data objects, either from the wearable tracking computer or the client computer.

In some examples, the tracking system further includes the client computer. Preferably, the client computer displays one or more portions of a timestamp visual model. In some examples, the timestamp visual model is generated based on one or more of the first or second timestamp data objects.

In some examples, the timestamp modeling computer generates a timestamp visual model based on the obtained one or more of the first or second timestamp data objects. Preferably, the timestamp modeling computer provides information to the client computer that causes the client computer to display one or more portions of the timestamp visual model.

In some examples, the timestamp modeling computer generates a timestamp data model based on the obtained one or more of the first or second timestamp data objects. Preferably, the timestamp modeling computer generates a timestamp visual model based on the generated timestamp data model. In some examples, the timestamp modeling computer provides information to the client computer that causes the client computer to display one or more portions of the timestamp visual model.

In some examples, initiating generation of timestamp data objects is the only functionality of the first user input control. Preferably, initiating generation of timestamp data objects is the only functionality of the second user input control.

In some examples, one or more of the first or second timestamp data objects includes an identifier that indicates a logical association with the wearable tracking computer.

In some examples, a haptic actuator is disposed in the wearable housing. Preferably, the haptic actuator haptically stimulates a wearer responsive to actuation of the first user input control or to actuation of the second user input control.

In some examples, a first haptic actuator is disposed in the wearable housing under the first user input control. Preferably, the first haptic actuator haptically stimulates a wearer responsive to actuation of the first user input control. In some examples, a second haptic actuator is disposed in the wearable housing under the second user input control. Preferably, the second haptic actuator haptically stimulates the wearer responsive to actuation of the second user input control.

In some examples, a first haptic actuator is disposed in the wearable housing under the first user input control. Preferably, the first haptic actuator haptically stimulates a radius bone or an ulna bone of a wearer responsive to actuation of the first user input control. In some examples, a second haptic actuator is disposed in the wearable housing under the second user input control. Preferably, the second haptic actuator haptically stimulates another of the radius bone or the ulna bone of the wearer responsive to actuation of the second user input control.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein:

FIG. 15 illustrates a schematic representation of an example power supply circuitry usable with the wearable tracking computer of FIG. 1;

FIG. 16 shows a logical representation of an example charging regulator circuitry usable with the wearable tracking computer of FIG. 1;

FIG. 17 illustrates a logical representation of an example power source usable with the wearable tracking computer of FIG. 1;

FIG. 18 shows a schematic representation of an example bypass circuitry usable with the wearable tracking computer of FIG. 1.

DETAILED DESCRIPTION OF THE VARIOUS EMBODIMENTS

Figure 1:
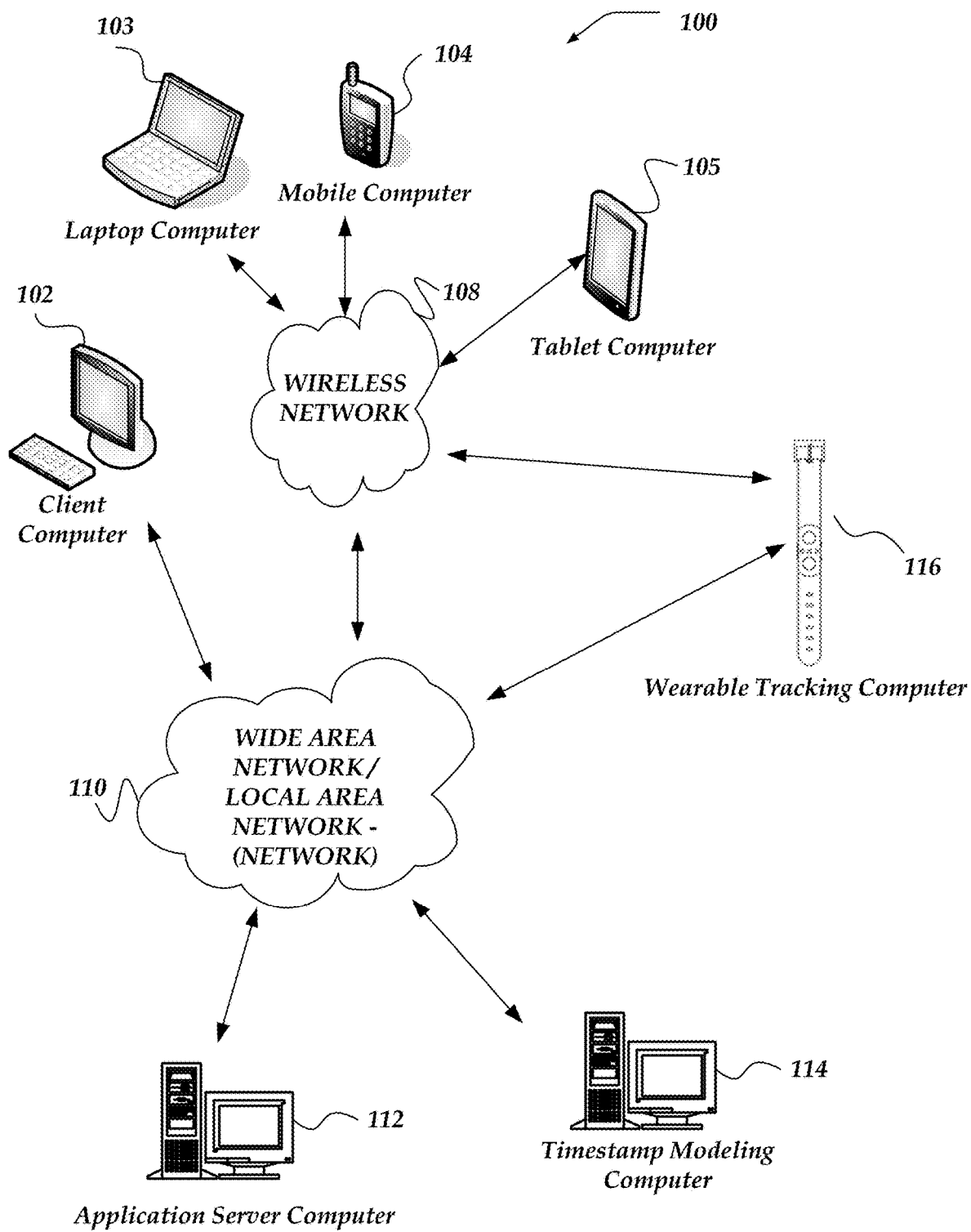
FIG. 1 illustrates a schematic representation of an example system environment, including an example client computer, example timestamp modeling computer, and an example wearable tracking computer, in which various embodiments may be implemented.

Various embodiments now will be described more fully hereinafter with reference to the accompanying drawings, which form a part hereof, and which show, by way of illustration, the best mode by which the invention may be practiced. The invention may, however, be embodied in many different forms and should not be construed as limited to the best mode embodiments set forth herein. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in one example" as used herein does not necessarily refer to the same embodiment or example, though it may. Furthermore, the phrase "in another embodiment" or "in another example" as used herein does not necessarily refer to a different embodiment or example, although it may. Thus, as described below, various embodiments or examples may be readily combined, without departing from the scope or spirit of the invention.

In addition, as used herein, the term "or" is an inclusive grammatical conjunction to indicate that one or more of the connected terms may be employed ("and/or"). For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described, unless the context clearly dictates otherwise. In addition, as used herein, the meanings of "a," "an," and "the" include plural references. Also, as used herein, plural references are intended to also disclose the singular, unless the context clearly dictates otherwise. For example, the term "metrics" is employed herein and is intended to reflect "one or more metrics" because only one metric may be employed or more than one metric may be employed. Moreover, one or more outputs may include multiple outputs, modifying the one or more outputs may include modifying a single one of the one or more outputs, and one or more modified outputs may include multiple outputs with a single one of the multiple outputs having been modified. The meaning of "in" includes "in" and "on." Further, as used herein, the terms "of" and "for" refer to both the meaning of the term "of" and the meaning of the term "for" in the sentence or phrase in which one or the other is employed (although they may have the same meaning), unless the context clearly dictates otherwise. For example, "a timestamp data object of an event type" also teaches "a timestamp data object for an event type." Also, as used herein, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise.

Illustrative Operating Environment

FIG. 1 shows components of an example environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 112, timestamp modeling computer 114, wearable tracking computer 116, or other components.

At least one embodiment of client computers 102-105 is described in more detail below in conjunction with FIG. 2. In one embodiment, at least some of client computers 102-105 may operate over one or more wired or wireless networks, such as networks 108 or 110. Generally, client computers 102-105 may include virtually any computer capable of communicating over a network to send and receive information, perform various online activities, offline actions, or others. In some embodiments, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or others. However, client computers 102-105 are not constrained to these services and may also be employed, for example, for end-user computing in other embodiments. It should be recognized that more or fewer client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or others. In some embodiments, client computers 102-105 may include virtually any portable computer capable of connecting to another computer and receiving information, such as laptop computer 103, mobile computer 104, tablet computers 105, or others. However, portable computers may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or others. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive or display graphics, text, multimedia, or others, employing virtually any web-based language. In some embodiments, the browser application is enabled to employ JavaScript, HyperText Markup Language (HTML), eXtensible Markup Language (XML), JavaScript Object Notation (JSON), Cascading Style Sheets (CSS), or others to display or send a message. In some embodiments, a user of the client computer may employ the browser application to perform various activities over a network (online). However, another application may also be used to perform various online activities.

Client computers 102-105 also may include one or more other client applications that are configured to receive or send content between another computer. The client application may include a capability to send or receive content or other information or signals. The client application may further provide information that identifies itself, including a type, capability, name, or others. In some embodiments, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets or other collections of data, sent between other client computers, application server computer 112, timestamp modeling computer 114, wearable tracking computer 116, or other computers.

Client computers 102-105 may further be configured to include a client application that enables an end-user to log into an end-user account that may be managed by another computer, such as application server computer 112, timestamp modeling computer 114, wearable tracking computer 116, or others. Such an end-user account, in some examples, may be configured to enable the end-user to manage one or more online activities, including in some examples, project management, software development, system administration, configuration management, search activities, social networking activities, browse various websites, communicate with other users, or others. Application server computer 112 may have a tangible, non-transitory storage medium that has information that indicates instructions that, when executed by a client computer (for example, client computers 102-105), cause the client computer to perform the actions described herein. In some examples, the information or instructions may be downloadable to the client computer from application server computer 112. Further, client computers may be arranged to enable users to provide configuration information or other information to wearable tracking computer 116. Also, client computers may be arranged to enable users to display reports, interactive user-interfaces, or results provided by wearable tracking computer 116.

Wireless network 108 is configured to couple client computers 103-105 and its components with network 110. Wireless network 108 may include any of a variety of wireless sub-networks that may further overlay stand-alone ad-hoc networks or others to provide an infrastructure-oriented connection for client computers 103-105. Such sub-networks may include mesh networks, Wireless LANs (WLANs), cellular networks, or others. In one embodiment, the system may include more than one wireless network.

Wireless network 108 may further include an autonomous system of terminals, gateways, routers, or others connected by wireless radio links or others. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G), 5th (5G) generation radio access for cellular systems, WLAN, Wireless Router (WR) mesh, or others. Access technologies such as 2G, 3G, 4G, 5G, and future access networks may enable wide area coverage for mobile computers, such as client computers 103-105 with various degrees of mobility. In some examples, wireless network 108 may enable a radio connection through a radio network access such as Global System for Mobile communication (GSM), General Packet Radio Services (GPRS), Enhanced Data rates for GSM Evolution (EDGE), code division multiple access (CDMA), time division multiple access (TDMA), Wideband Code Division Multiple Access (WCDMA), High Speed Downlink Packet Access (HSDPA), Long Term Evolution (LTE), and others. In other examples, wireless network may employ short distance wireless technology, such as wireless technology that adheres to standards defined under the mark BLUETOOTH® or others. In essence, wireless network 108 may include virtually any wireless communication mechanism by which information may travel between client computers 103-105 and another computer, network, a cloud-based network, a cloud instance, or others.

Network 110 is configured to couple network computers with other computers, including, application server computer 112, timestamp modeling computer 114, wearable tracking computer 116, client computers 102-105 through wireless network 108, or others. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, or other forms of computer-readable media. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including, for example, DS-0, DS-1, DS-2, DS-3, DS-4, OC-3, OC-12, OC-48, or others. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, or other wireless media.

One embodiment of application server computer 112 or timestamp modeling computer 114 is described in more detail below in conjunction with FIG. 3. Briefly, however, application server computer 112 or timestamp modeling computer 114 includes virtually any network computer capable of hosting applications or providing services in a network environment.

One embodiment of wearable tracking computer 116 is described in more detail below in conjunction with FIG. 2. Briefly, however, wearable tracking computer 116 may include virtually any client computer capable of detecting one or more events, generating timestamp data objects based on the one or more detected events, or providing generated timestamp data objects to one or more other client computers or network computers. Preferably, wearable tracking computer 116 includes one or more hard input controls (for example, one or more mechanical input controls) that are dedicated to facilitating detection of the one or more events. Most preferably, the one or more hard input controls are permanently dedicated to facilitating detection of the one or more events.

Although FIG. 1 illustrates application server computer 112, timestamp modeling computer 114, and wearable tracking computer 116, each as a single computer, the innovations or embodiments are not so limited. For example, one or more functions of application server computer 112, timestamp modeling computer 114, wearable tracking computer 116, or others, may be distributed across one or more distinct client or network computers. Moreover, in one or more embodiments, wearable tracking computer 116 may be implemented using a plurality of wearable tracking computers or non-wearable client computers. Further, in one or more of the various embodiments, application server computer 112 or timestamp modeling computer 114 may be implemented using one or more cloud instances in one or more cloud networks. Accordingly, these innovations and embodiments are not to be construed as being limited to a single environment, and other configurations and other architectures are also envisaged.

Illustrative Client Computer

Figure 2:
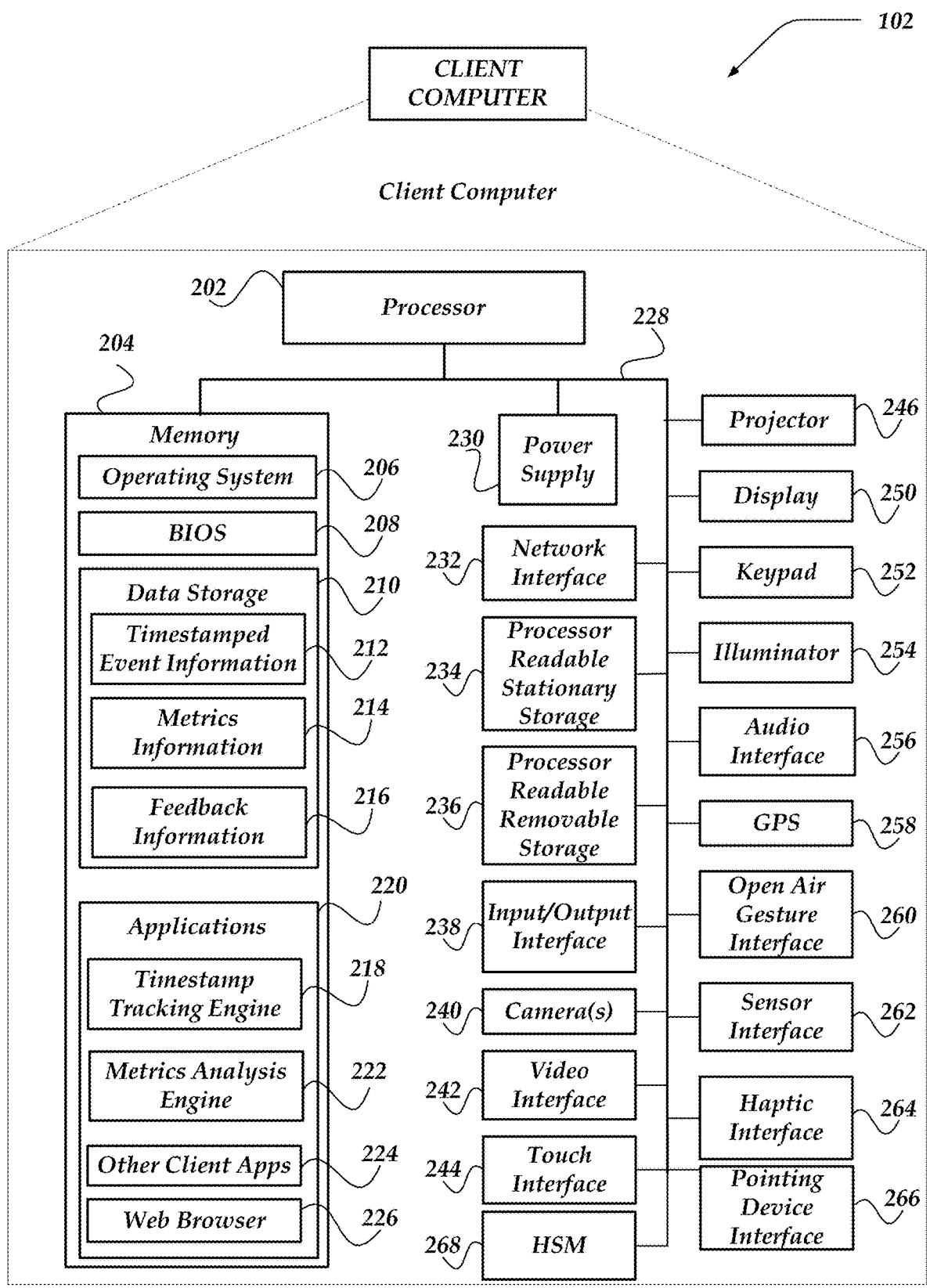
FIG. 2 shows a schematic representation of the client computer of FIG. 1.

FIG. 2 shows a schematic representation of client computer 102 of FIG. 1. Client computer 102 may include more or fewer components than those shown. One or more of client computers 103-105 or wearable tracking computer 116 may include one or more of the components discussed regarding client computer 102.

Client computer 102 may include processor 202 in communication with memory 204 via bus 228. Client computer 102 may also include power supply 230, network interface 232, audio interface 256, display 250, keypad 252, illuminator 254, video interface 242, input/output interface 238, haptic interface 264, global positioning systems (GPS) receiver or transceiver 258, open air gesture interface 260, sensor interface 262 (for example, a temperature interface, biometric interface, accelerometer interface, weight scale interface, or others), camera(s) 240, projector 246, pointing device interface 266, processor-readable stationary storage device 234, or processor-readable removable storage device 236. Client computer 102 may optionally communicate with a base station (not shown) or directly with another computer. And in some embodiments, although not shown, a gyroscope may be employed within client computer 102 to measuring or maintaining an orientation of client computer 102.

Power supply 230 may provide power to client computer 102. A rechargeable or non-rechargeable battery may be used to provide power. The power may also be provided by an external power source, such as an AC adapter or a powered docking cradle that supplements or recharges the battery.

Network interface 232 includes circuitry for coupling client computer 102 to one or more networks and is constructed for use with one or more communication protocols and technologies including protocols and technologies that implement any portion of the Open Systems Interconnection model (OSI model), such as global system for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, orthogonal frequency-division multiplexing (OFDM), CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 102, e.g., using voice recognition, detecting touch based on sound, or others.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or others. For example, video interface 242 may be coupled to a digital video camera, a web-camera, or others. Video interface 242 may comprise a lens, an image sensor, or other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 102 may also comprise hardware security module (HSM) 268 for providing additional tamper resistant safeguards for generating, storing or using security/cryptographic information, such as keys, digital certificates, passwords, passphrases, two-factor authentication information, or others. In some embodiments, hardware security module may be employed to support one or more standard public key infrastructures (PKI) and may be employed to generate, manage, or store keys pairs or others. In some embodiments, HSM 268 may be a stand-alone computer or may be arranged as a hardware card that may be added to a client computer.

Client computer 102 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, or others. Input/output interface 238 can utilize one or more technologies, such as Universal Serial Bus (USB), Infrared, Wi-Fi™, WiMax, Bluetooth™, or others.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or others), or others. Sensors may be one or more hardware sensors that collect or measure data that is external to client computer 102.

Haptic interface 264 may be arranged to provide tactile feedback to a user of the client computer. For example, the haptic interface 264 may be employed to vibrate client computer 102 in a particular way when another user of a computer is calling. Sensor interface 262 may be used to provide a temperature measurement input of a user of client computer 102 or equipment associated with client computer 102 (for example, from one or more wearable sensor or others), a temperature changing output to the user or equipment of client computer 102, an accelerometer measurement input (for example, from a pedometer or others), a weight input of the user, equipment, or resources consumed by the user or equipment (for example, from a scale or others), biometric measurement inputs of the user or equipment (for example, from one or more wearable sensors or others), volumetric flow measurement inputs of resources consumed or provided in one or more intake sessions to the user or equipment (for example, one or more impellers or others), or other sensor inputs that may facilitate tracking performance or one or more other characteristics information of the user or equipment, such as activity rating, lifestyle rating, impairment status, or others (for example, one or more wearable sensors available under the mark FITBIT or others). In some embodiments, the one or more sensors may be part of client computer 102. In other embodiments, the one or more sensors may be separate and discrete from client computer 102. Open air gesture interface 260 may sense physical gestures of a user of client computer 102, for example, by using single or stereo video cameras, radar, a gyroscopic sensor inside a computer held or worn by the user, or others. In some embodiments, camera 240 may be used to track physical eye movements of a user of client computer 102.

GPS receiver or transceiver 258 can determine the physical coordinates of client computer 102 on the surface of the Earth, which typically outputs a location as latitude and longitude values. GPS receiver or transceiver 258 can also employ other geo-positioning mechanisms, including triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or others, to further determine the physical location of client computer 102 on the surface of the Earth. It is understood that under different conditions, GPS receiver or transceiver 258 can determine a physical location for client computer 102. In one or more embodiments, however, client computer 102 may, through other components, provide other information that may be employed to determine a physical location of the client computer, including, for example, a Media Access Control (MAC) address, IP address, or others.

In one or more of the various embodiments, one or more applications (for example, one or more operating systems 206, timestamp tracking engines 218, metrics analysis engines 222, web browsers 226, or other client applications 224) may be arranged to employ geo-location information to select one or more localization features, such as one or more time zones, languages, currencies, calendar formatting, geographical regions or territories, or others. In some of the various embodiments, localization features may be used in one or more portions of file system object meta-data, file system objects, file systems, user-interfaces, reports, internal processes, databases, or others. In some embodiments, geo-location information used for selecting localization information may be provided by GPS receiver or transceiver 258. Also, in some embodiments, geo-location information may include information provided using one or more geo-location protocols over one or more networks, such as wireless network 108, network 110, or others.

Human interface components can be peripheral devices that are physically separate from client computer 102, allowing for remote input or output to client computer 102. For example, information routed as described here through human interface components such as display 250 or keyboard 252 can instead be routed through network interface 232 to appropriate human interface components located remotely. Examples of human interface peripheral components that may be remote include audio devices, pointing devices, keypads, displays, cameras, projectors, and others. These peripheral components may communicate over a Pico Network such as Bluetooth™ Zigbee™, or others. Some examples of a client computer with such peripheral human interface components include a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, or others. The client computer's browser application may employ virtually any programming language, including a wireless application protocol (WAP) messages or others. In some embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or others.

Memory 204 may include RAM, ROM, or other types of memory. Memory 204 illustrates an example of computer-readable storage media (devices) for storage of information such as computer-readable instructions, data structures, program modules, or other data. Memory 204 may store BIOS 208 for controlling low-level operation of client computer 102. The memory may also store operating system 206 for controlling the operation of client computer 102. It will be appreciated that this component may include a general-purpose operating system such as a version of UNIX or LINUX™ or a specialized client computer communication operating system such as Windows Phone™ or the Symbian® operating system. The operating system may include or interface with a Java virtual machine module that enables control of hardware components or operating system operations via Java application programs.

Memory 204 may further include one or more data storage 210, which can be utilized by client computer 102 to store, among other things, applications 220 or other data. For example, data storage 210 may also be employed to store information that describes various capabilities of client computer 102. The information may then be provided to another device or computer based on any of a variety of methods, including being sent as part of a header during a communication, sent upon request, or others. Data storage 210 may also be employed to store social networking information including address books, buddy lists, aliases, user profile information, or others. Data storage 210 may further include program code, data, algorithms, or others, for use by a processor, such as processor 202 to execute and perform actions. In some embodiments, at least some of data storage 210 might also be stored on another component of client computer 102, including non-transitory processor-readable removable storage device 236, processor-readable stationary storage device 234, or even external to the client computer. Data storage 210 may include, for example, timestamped event information 212, metrics information 214, feedback information 216, or other information. Timestamped event information 212 may include information that indicates one or more timestamps generated based on one or more events, and the one or more timestamps may indicate one or more times at which the one or more events were detected or determined. Timestamped event information 212 may include information that indicates one or more event categories or types associated with the one or more events. Metrics information 214 may include information that indicates one or more values of one or more metrics associated with one or more users and generated based on the timestamped event information. Feedback information 216 may include information that indicates feedback for the user responsive to one or more events. For example, the information may indicate visual, audible, or haptic feedback to provide to the user responsive to generation of one or more portions of timestamped event information 212.

Applications 220 may include computer executable instructions which, when executed by client computer 102, transmit, receive, or otherwise process instructions and data. Applications 220 may include, for example, timestamp tracking engine 218, metrics analysis engine 222, other client applications 224, web browser 226, or other applications that perform actions further described below. In one or more of the various embodiments, one or more applications 220 (for example, one or more timestamp tracking engine 218, metrics analysis engine 222, other client applications 224, web browser 226, or other applications) may be separate and discrete from one or more other applications 220. In some of the various embodiments, one or more applications 220 may include one or more portions of one or more other applications 220 (for example, one or more portions of the one or more other applications 220 may include one or more processes, programming concepts, or others within the one or more applications 220). Client computer 102 may be arranged to exchange communications, such as queries, searches, messages, notification messages, event messages, alerts, performance metrics, log data, API calls, or others with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, or others.

Additionally, in one or more embodiments (not shown in the figures), client computer 102 may include one or more embedded logic hardware devices instead of one or more CPUs, such as an Application Specific Integrated Circuits (ASICs), Field Programmable Gate Arrays (FPGAs), Programmable Array Logics (PALs), or others. The one or more embedded logic hardware devices may directly execute embedded logic to perform actions. Also, in one or more embodiments (not shown in the figures), client computer 102 may include one or more hardware microcontrollers instead of one or more CPUs. In some embodiments, the one or more microcontrollers may directly execute their own embedded logic to perform actions and access their own internal memory and its own external Input and Output Interfaces (e.g., hardware pins or wireless transceivers) to perform actions as a System On a Chip (SOC) or others.

Illustrative Network Computer

Figure 3:
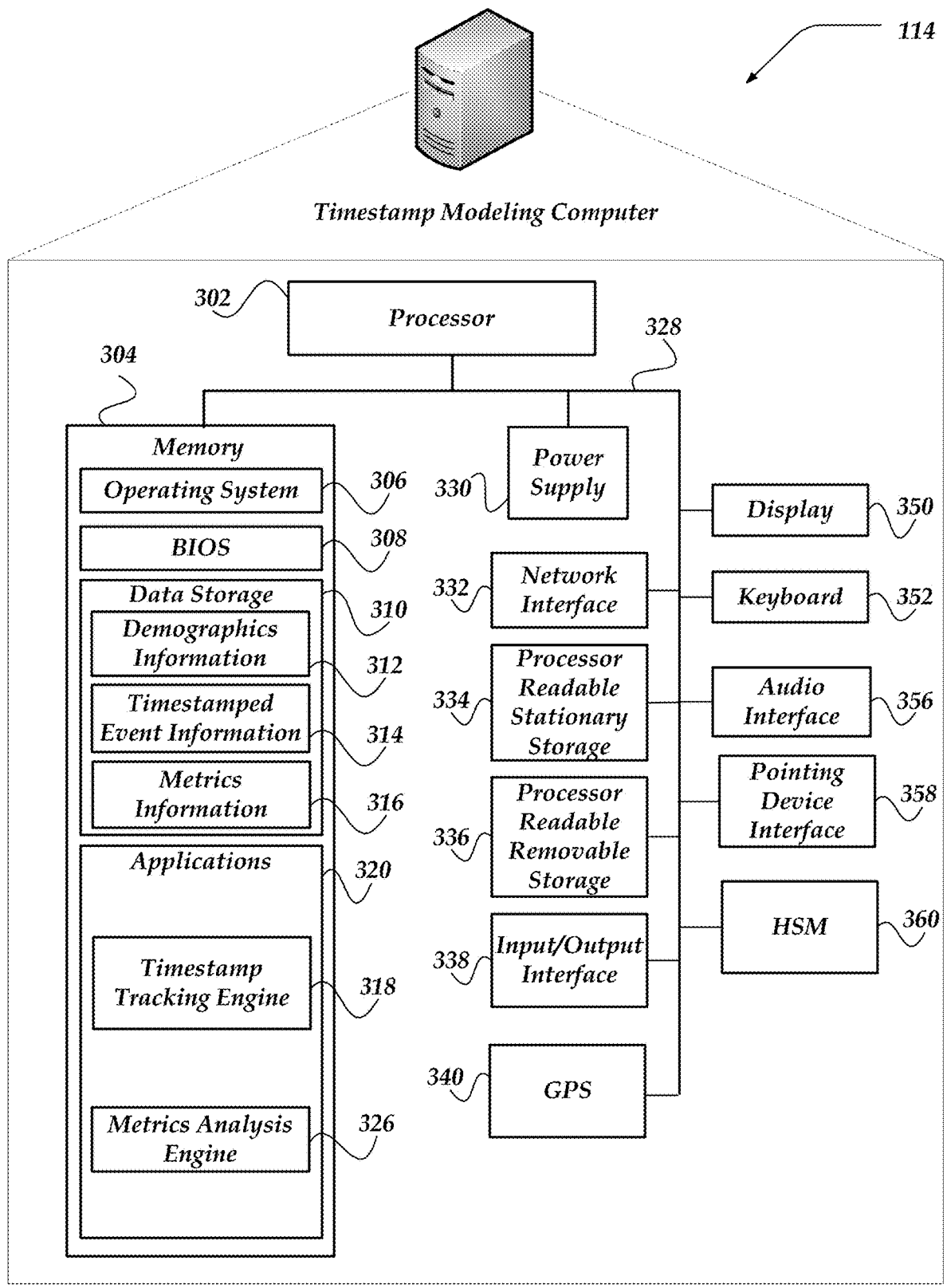
FIG. 3 illustrates a schematic representation of the timestamp modeling computer of FIG. 1.

FIG. 3 illustrates a schematic representation of timestamp modeling computer 114 of FIG. 1. Timestamp modeling computer 114 may include more or fewer components than those shown. One or more network computers 112 or 114, client computers 102-105, or wearable tracking computer 116 may include one or more of the components discussed regarding client computer 102.

As shown in the figure, timestamp modeling computer 114 includes a processor 302 that may be in communication with a memory 304 via a bus 328. In some embodiments, processor 302 may be comprised of one or more hardware processors or one or more processor cores. In some cases, one or more of the one or more processors may be specialized processors designed to perform one or more specialized actions, such as those described herein. Timestamp modeling computer 114 also includes a power supply 330, network interface 332, audio interface 356, display 350, keyboard 352, input/output interface 338, processor-readable stationary storage device 334, or processor-readable removable storage device 336. Power supply 330 provides power to timestamp modeling computer 114.

Network interface 332 includes circuitry for coupling timestamp modeling computer 114 to one or more networks and is constructed for use with one or more communication protocols and technologies including protocols and technologies that implement any portion of the Open Systems Interconnection model (OSI model), such as global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired or wireless communication protocols. Network interface 332 is sometimes known as a transceiver, transceiving device, or network interface card (NIC). Timestamp modeling computer 114 may optionally communicate with a base station (not shown) or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of timestamp modeling computer 114, for example, using voice recognition.

Display 350 may be a liquid crystal display (LCD), gas plasma, electronic ink, light emitting diode (LED), Organic LED (OLED), or any other type of light reflective or light transmissive display that can be used with a computer. Display 350 may be a handheld projector or pico projector capable of projecting an image on a wall or another object.

Timestamp modeling computer 114 may also comprise input/output interface 338 for communicating with external devices or computers not shown in FIG. 3. Input/output interface 338 can utilize one or more wired or wireless communication technologies, such as USB™ Firewire™, Wi-Fi™, WiMax, Thunderbolt™, Infrared, Bluetooth™, Zigbee™, serial port, parallel port, or others.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or others), or others. Sensors may be one or more hardware sensors that collect or measure data that is external to timestamp modeling computer 114. Human interface components can be physically separate from timestamp modeling computer 114, allowing for remote input or output to timestamp modeling computer 114. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices, such as mice, styluses, track balls, or others, may communicate through pointing device interface 358 to receive user input.

GPS receiver or transceiver 340 can determine the physical coordinates of timestamp modeling computer 114 on the surface of the Earth, which typically outputs a location as latitude and longitude values. GPS receiver or transceiver 340 can also employ other geo-positioning mechanisms, including triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or others, to further determine the physical location of timestamp modeling computer 114 on the surface of the Earth. It is understood that under different conditions, GPS receiver or transceiver 340 can determine a physical location for timestamp modeling computer 114. In at least one embodiment, however, timestamp modeling computer 114 may, through other components, provide other information that may be employed to determine a physical location of the client computer, including, for example, a Media Access Control (MAC) address, IP address, or others.

In one or more of the various embodiments, one or more applications (for example, one or more timestamp tracking engines 318, metrics analysis engines 326, dashboards, or other applications) may be arranged to employ geo-location information to select one or more localization features, such as one or more time zones, languages, currencies, calendar formatting, geographical regions or territories, or others. In some of the various embodiments, localization features may be used in one or more portions of file system object meta-data, file system objects, file systems, user-interfaces, reports, internal processes, databases, or others. In some embodiments, geo-location information used for selecting localization information may be provided by GPS receiver or transceiver 340. Also, in some embodiments, geo-location information may include information provided using one or more geo-location protocols over one or more networks, such as wireless network 108, network 110, or others.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of timestamp modeling computer 114. The memory also stores an operating system 306 for controlling the operation of timestamp modeling computer 114. It will be appreciated that this component may include a general-purpose operating system such as a version of UNIX or LINUX™ or a specialized operating system such as Microsoft Corporation's Windows® operating system or the Apple Corporation's IOS® operating system. The operating system may include or interface with a Java virtual machine module that enables control of hardware components or operating system operations via Java application programs. Likewise, other runtime environments may be included.

Memory 304 may further include one or more data storage 310, which can be utilized by timestamp modeling computer 114 to store, among other things, applications 320 or other data. For example, data storage 310 may also be employed to store information that describes various capabilities of timestamp modeling computer 114. The information may then be provided to another device or computer based on any of a variety of methods, including being sent as part of a header during a communication, sent upon request, or others. Data storage 310 may also be employed to store social networking information including address books, buddy lists, aliases, user profile information, or others. Data storage 310 may further include program code, data, algorithms, or others, for use by a processor, such as processor 302 to execute and perform actions such as those actions described below. In some embodiments, at least some of data storage 310 might also be stored on another component of timestamp modeling computer 114, including non-transitory media inside processor-readable removable storage device 336, processor-readable stationary storage device 334, or any other computer-readable storage device within timestamp modeling computer 114 or even external to timestamp modeling computer 114. Data storage 310 may include, for example, demographics information 312, timestamped event information 314, metrics information 316, or other information. Demographics information 312 may include information indicative of characteristics, historical timestamped event information, historical performance, or others associated with one or more geographical regions, sessions, users, entities associated with one or more users, populations of users, groups within the one or more populations of users, or others. Timestamped event information 314 may include information that indicates one or more timestamps generated based on one or more events, and the one or more timestamps may indicate one or more times at which the one or more events were detected or determined. Timestamped event information 314 may include information that indicates one or more event categories or types associated with the one or more events. Metrics information 316 may include information that indicates one or more values of one or more metrics associated with one or more users and generated based on the timestamped event information.

Applications 320 may include computer executable instructions which, when executed by timestamp modeling computer 114, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, databases, web services, and so forth. Applications 320 may include timestamp tracking engine 318, metrics analysis engine, or other applications that perform actions further described below. In one or more of the various embodiments, one or more applications 220 or 320 may be separate and discrete from one or more other applications 220 or 320. In some of the various embodiments, one or more applications 220 or 320 may include one or more portions of one or more other applications 220 or 320 (for example, one or more portions of the one or more other applications 220 or 320 may include one or more processes, programming concepts, or others within the one or more applications 220 or 320). In some embodiments, one or more of the applications may be implemented as modules or components of another application. Further, in some embodiments, applications may be implemented as operating system extensions, modules, plugins, or others.

Furthermore, in some of the various embodiments, timestamp tracking engine 318 or metrics analysis engine 326 may be operative in a cloud-based computing environment. In some of the various embodiments, these engines, or others, that comprise the control platform or control system may be executing within virtual machines or virtual servers that may be managed in a cloud-based based computing environment. In some of the various embodiments, in this context the applications may flow from one physical network computer within the cloud-based environment to another depending on performance and scaling considerations automatically managed by the cloud computing environment. Likewise, in some of the various embodiments, virtual machines or virtual servers dedicated to timestamp tracking engine 318 or metrics analysis engine 326 may be provisioned and de-commissioned automatically. Also, in some of the various embodiments, timestamp tracking engine 318, metrics analysis engine 326, or others may be located in virtual servers running in a cloud-based computing environment rather than being tied to one or more specific physical network computers. In some embodiments, one or more of tracking engine 318, metrics analysis engine 326, or others may individually or cooperatively perform one or more portions of one or more of the actions described herein, such as one or more actions associated with one or more blocks in one or more of the processes described herein. In some embodiments, one or more of the named engines have sub-engines (not shown) that individually or cooperatively perform one or more of the one or more actions. In some embodiments, one or more of the named engines are included as part of another one or more of the named engines.

Further, timestamp modeling computer 114 may also comprise hardware security module (HSM) 360 for providing additional tamper resistant safeguards for generating, storing or using security/cryptographic information, such as keys, digital certificates, passwords, passphrases, two-factor authentication information, or others. In some embodiments, hardware security module may be employed to support one or more standard public key infrastructures (PKI) and may be employed to generate, manage, or store keys pairs, or others. In some embodiments, HSM 360 may be a stand-alone network computer, in other cases, HSM 360 may be arranged as a hardware card that may be installed in a network computer.

Additionally, in one or more embodiments (not shown in the figures), timestamp modeling computer 114 may include one or more embedded logic hardware devices instead of one or more CPUs, such as an Application Specific Integrated Circuits (ASICs), Field Programmable Gate Arrays (FPGAs), Programmable Array Logics (PALs), or others. The one or more embedded logic hardware devices may directly execute embedded logic to perform actions. Also, in one or more embodiments (not shown in the figures), timestamp modeling computer 114 may include one or more hardware microcontrollers instead of one or more CPUs. In some embodiments, the one or more microcontrollers may directly execute their own embedded logic to perform actions and access its own internal memory and its own external Input and Output Interfaces (e.g., hardware pins or wireless transceivers) to perform actions as a System On a Chip (SOC) or others.

Illustrative Logical Wearable Tracking Computer

Figure 4A:
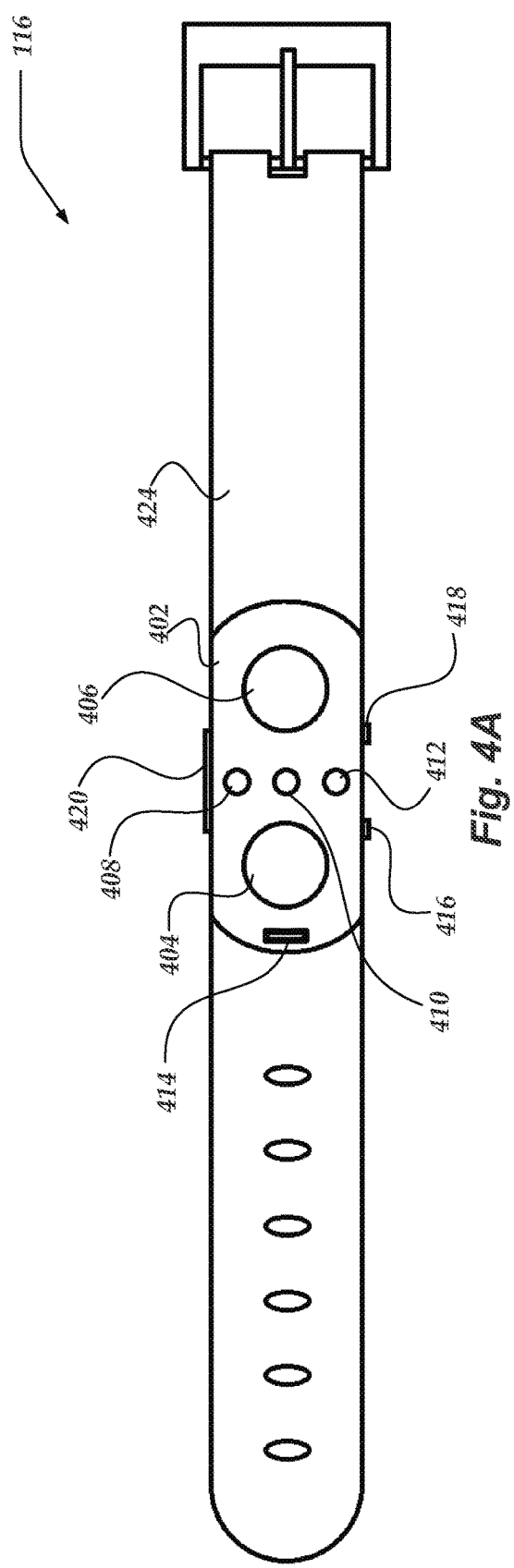
FIG. 4A shows a top plan view of the wearable tracking computer of FIG. 1.
Figure 4B:
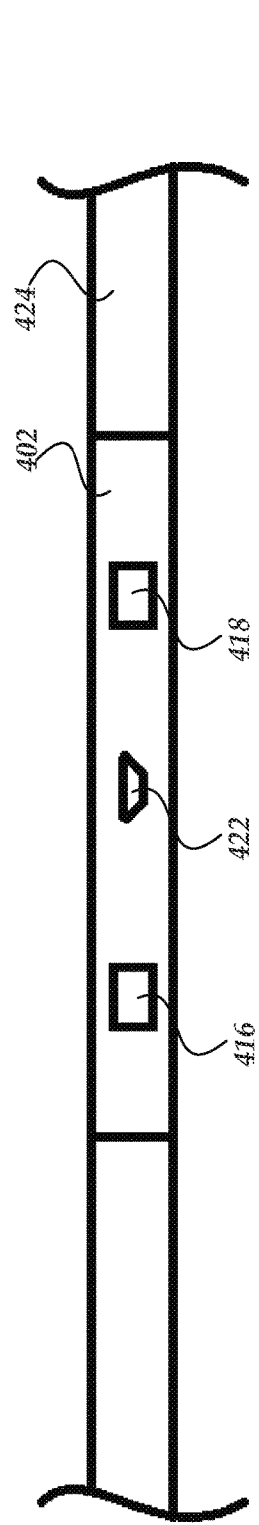
FIG. 4B illustrates a side elevational view of the wearable tracking computer of FIG. 1.

FIG. 4A shows a top plan view of wearable tracking computer 116. FIG. 4B illustrates a side elevational view of wearable tracking computer 116. Wearable tracking computer 116 includes housing 402 that houses one or more portions of wearable tracking computer 116, such as circuitry (see, for example, FIGS. 2 and 9A-19). One or more user input controls, such as user input control 404 or user input control 406 (or further user input controls that may be dedicated to functions similar to user input controls 404 or 406), may be disposed in housing 402. Actuation of one of input controls 404 or 406 causes wearable tracking computer 116 to generate a timestamp data object based on the time of the actuation as further discussed regarding FIGS. 5-8. Preferably, one or more input controls 404 or 406 are physical input controls (for example, mechanical user input controls) that are dedicated to initiating generation of timestamp data objects. Most preferably, one or more input controls 404 or 406 are permanently dedicated to initiating generation of timestamp data objects. Implementing input controls 404 or 406 as physical input controls (as opposed to on-screen buttons provided by software) facilitates input controls 404 or 406 being continuously available to the user, without requiring additional actions such as unlocking a screen, opening an application, or other actions. Dedicating input controls 404 or 406 to only initiating generation of timestamp data objects (as opposed to a physical control or portion of a display screen that provides different functionality at different times based on characteristics of the actuation, computer state, or software instructions) facilitates the functionality of initiating generation of timestamp data objects continuously and easily being available to the user. When input controls 404 or 406 are dedicated to only initiating generation of timestamp data objects without further functionality, the user is not required to consider the state of wearable tracking computer 116 or to manipulate other controls prior to availability of the functionality of initiating generation of timestamp data objects.

Figure 5:
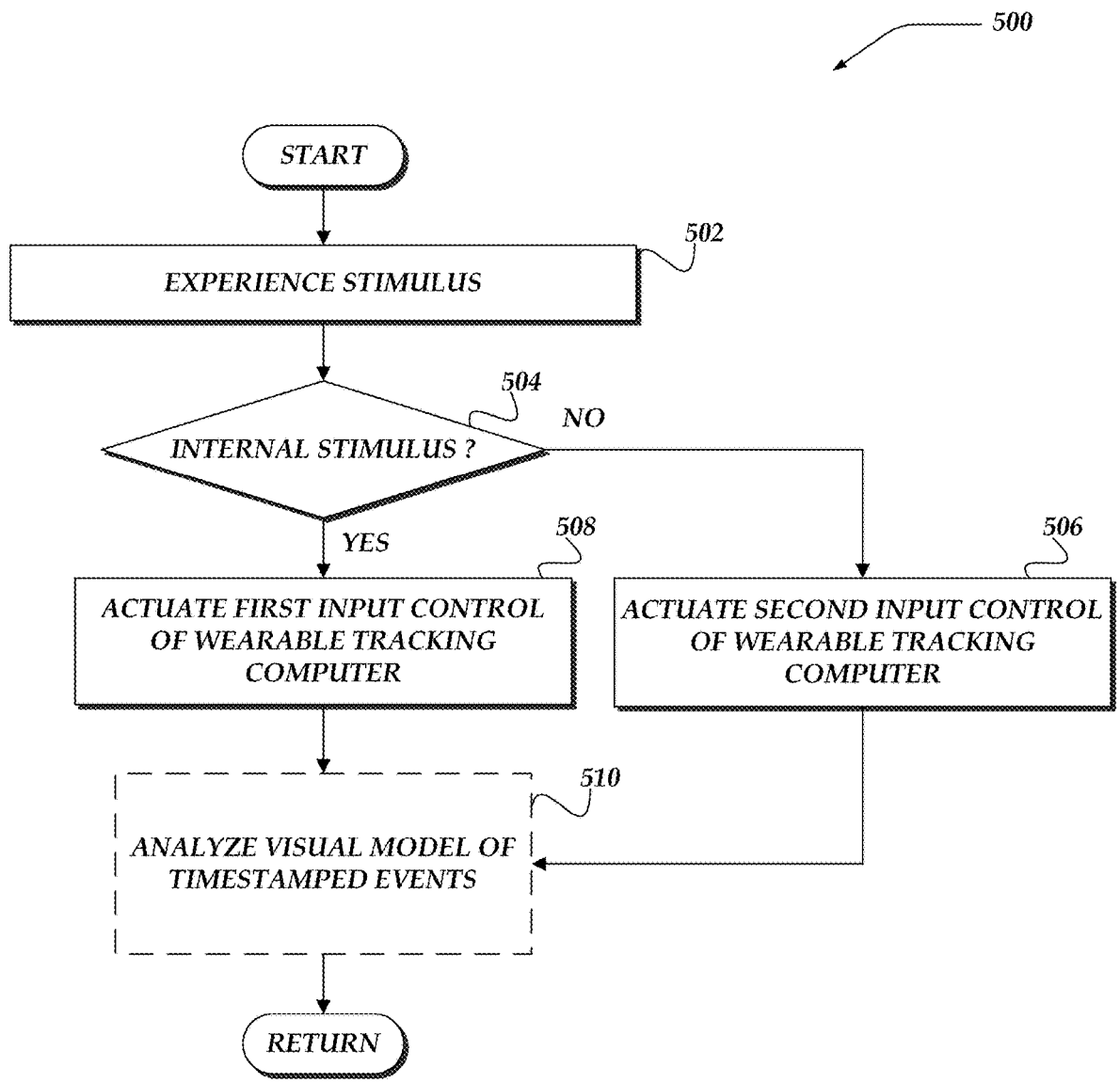
FIG. 5 shows an overview flowchart of an example process for using the wearable tracking computer of FIG. 1.
Figure 6:
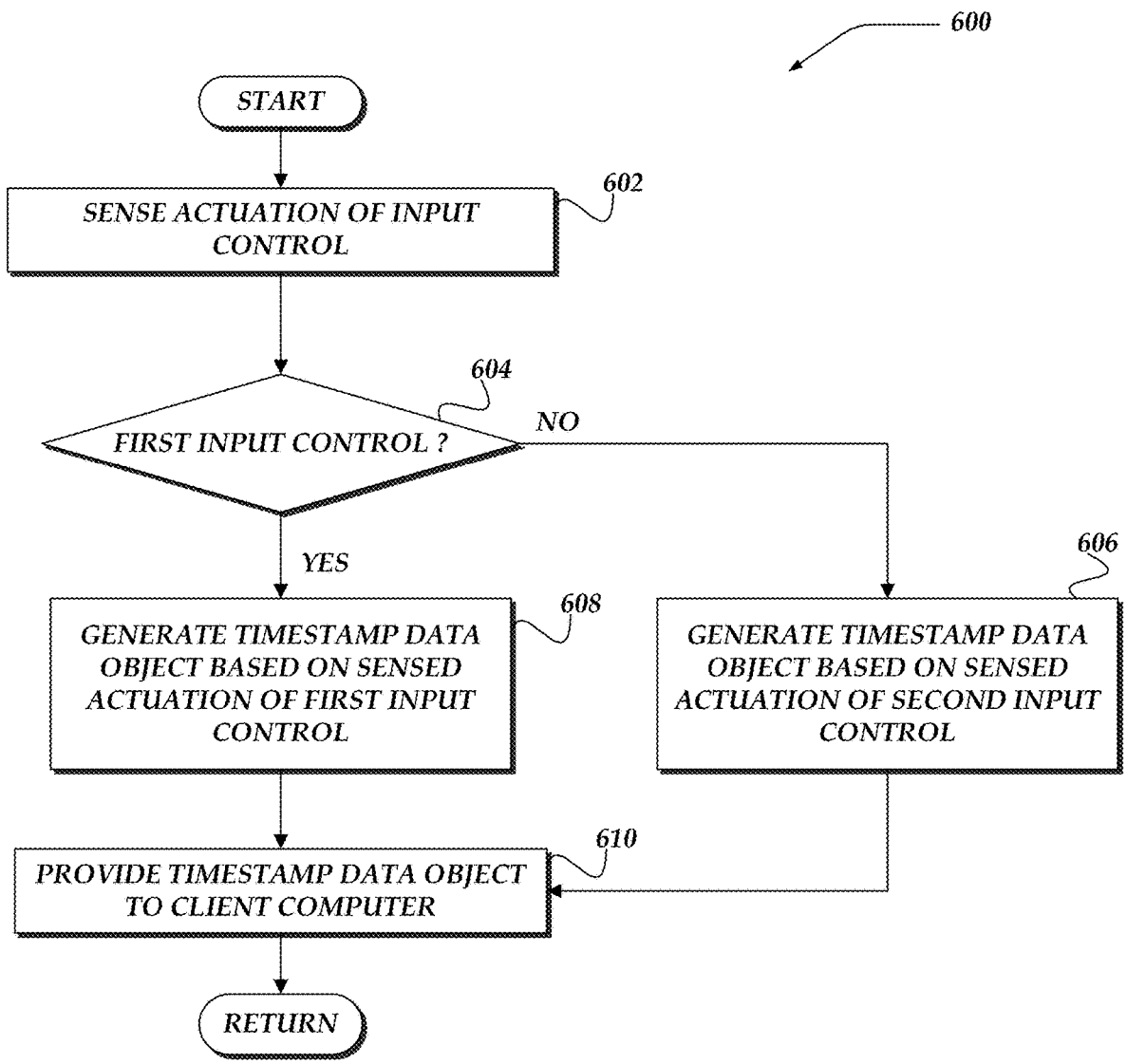
FIG. 6 illustrates an overview flowchart of an example process for generating an example timestamp data object.

One or more visual feedback components, such as light 408, light 410, or light 412, may be disposed in housing 402 and may provide feedback to the user responsive to one or more events (for example, actuation of one of input controls 404 or 406) or conditions (for example, low battery, connected to a client computer over a wires network, or others) as further discussed regarding FIGS. 5 and 6. One or more speakers may be disposed in housing 402, and housing 402 may have one or more slots 414 disposed over the one or more speakers to facilitate providing audible feedback to the user responsive to one or more events or conditions. One or more user input controls, such as input control 416 or input control 418, may control operational functionality of wearable tracking computer 116, such as enabling or disabling particular feedback types (for example, audio, visual, or haptic feedback) or initiating connection with a client computer (for example, wireless connection over network 108). Housing 402 may have protruding portion 420 that carries identifying information, such as a logo or other identifying information. As shown in FIG. 4B, housing may have one or more connection ports, such as connection port 422 that facilitates physical connection to a network (for example, network 110) or directly to a client computer as further discussed regarding FIGS. 9A, 9B, 11, and 12.

In the example shown in FIGS. 4A and 4B, wearable tracking computer 116 is shown as a wristband with replaceable strap 422, yet wearable tracking computer 116 may take other wearable forms, such as a necklace, earrings, finger rings, glasses, or other wearable elements. For example, wearable tracking computer 116 may be implemented as a pair of earrings, with a first earring having input control 404 and a second earring having input control 406. In some examples, the first earring sends a signal to the second earring to indicate that input control 404 has been actuated, and the second earing performs the remainder of the functionality described regarding wearable tracking computer 116.

FIG. 5 shows an overview flowchart of example process 500 for using a wearable tracking computer, such as wearable tracking computer 116. After a start block, at block 502, a user experiences a stimulus. The stimulus may be anything that invokes a response from the user, whether physical or mental. A stimulus may include a thought or experience that invokes a feeling of stress or other response in the user, such as a depressive thought, stubbing a toe, being insulted by another person, or other events. At block 504, the user determines whether the stimulus is an internal stimulus or an external stimulus. As used herein, the term "internal stimulus" refers to a stimulus generated in a user's mind, such as an emotional experience based on the user's thoughts (for example, fear of intimacy or abandonment, excitement based on daydreams of future planning, or others). As used herein, the term "external stimulus" refers to a stimulus generated based on an event outside of the user's mind, such as a physical feeling (for example, stomach ache, warmth, or others) or an emotional experience based on an external event (for example, attraction to another human, anger at an insult spoken by another human, or others). If the stimulus is an internal stimulus, the process proceeds to block 508; otherwise, the process proceeds to block 506.

At block 506, the user actuates a first input control of the wearable tracking computer, such as input control 404 of wearable tracking computer 116. At block 508, the user actuates a second input control of the wearable computer, such as input control 406 of wearable tracking computer 116. In some examples, the input controls have visual indicators that indicate their designated functions, such as an "O" on the first input control and an "I" on the second input control.

At block 510, the user optionally analyzes one or more visual models of timestamped events that correspond to actuation of one or more of the first or second input controls. The one or more visual models may provide visual indications of quantities or changes in quantities of internal or external stimulus events recorded by the user with the wearable tracking computer during one or more predetermined time periods, such as hours, days, weeks, months, or other time periods. The one or more visual models may provide visual indications of comparisons with quantities or changes in quantities of internal or external stimulus events recorded by other users during the one or more predetermined time periods, as further discussed regarding FIGS. 7 and 8. Block 510 is optional because visual models may not be provided, and the user may rely only on feedback from the wearable tracking computer responsive to actuation of the first or second input controls or may directly view timestamp data objects or timestamp data models (see, for example, FIG. 8). Next, the process may end or return to block 502.

FIG. 6 illustrates an overview flowchart of example process 600 for generating an example timestamp data object. One or more portions of process 600 may be performed by one or more engines in one or more wearable tracking computers (for example, one or more timestamp tracking engines 218 in wearable tracking computer 116). After a start block, at block 602, an actuation of an input control may be detected. The input control may be actuated as described regarding block 506 or block 508. The wearable tracking computer may sense the actuation of the input control as further discussed regarding FIGS. 9 and 10.

Figure 9A:
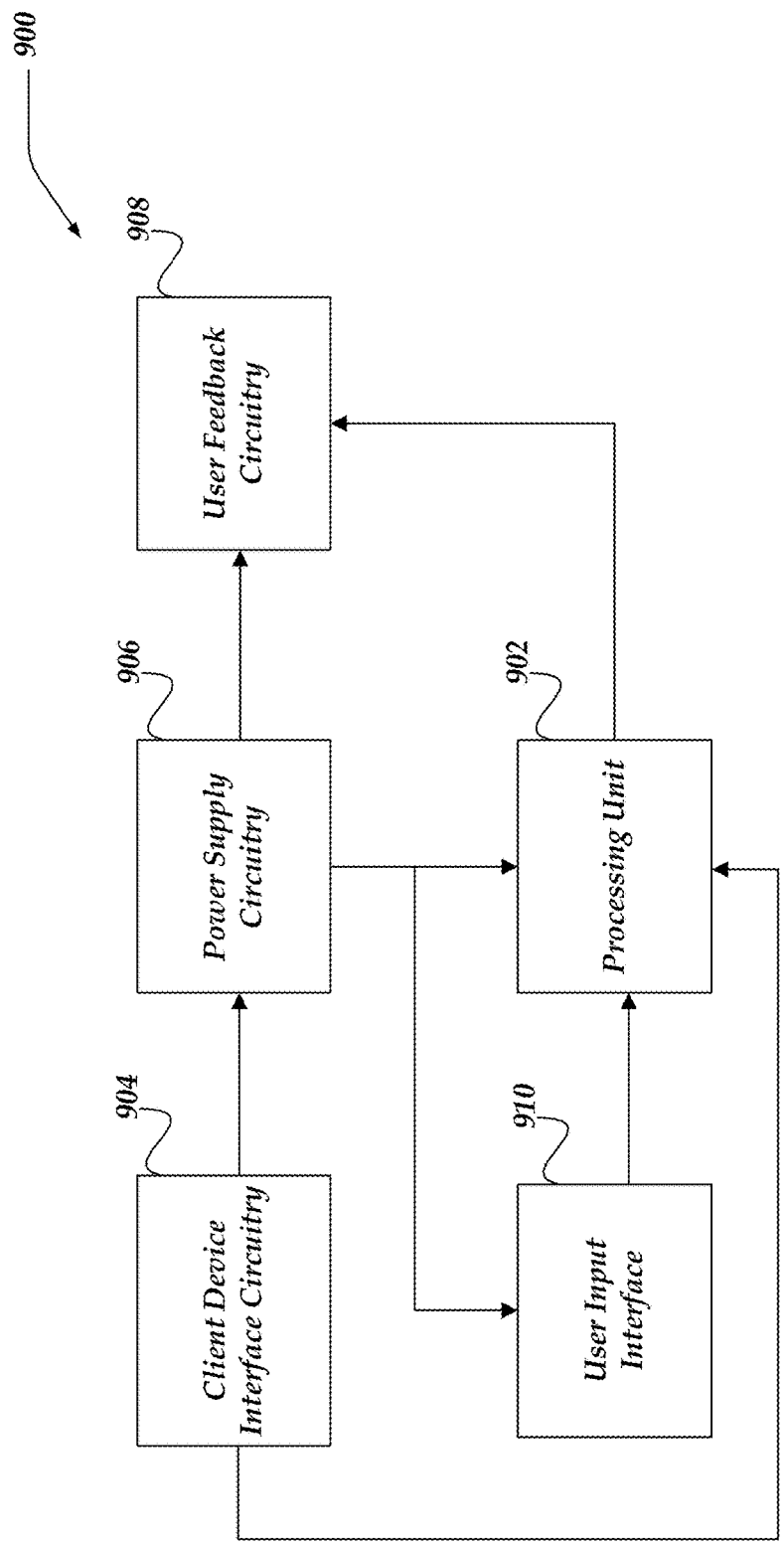
FIG. 9A shows a block diagram of example components usable with the wearable tracking computer of FIG. 1.
Figure 9B:
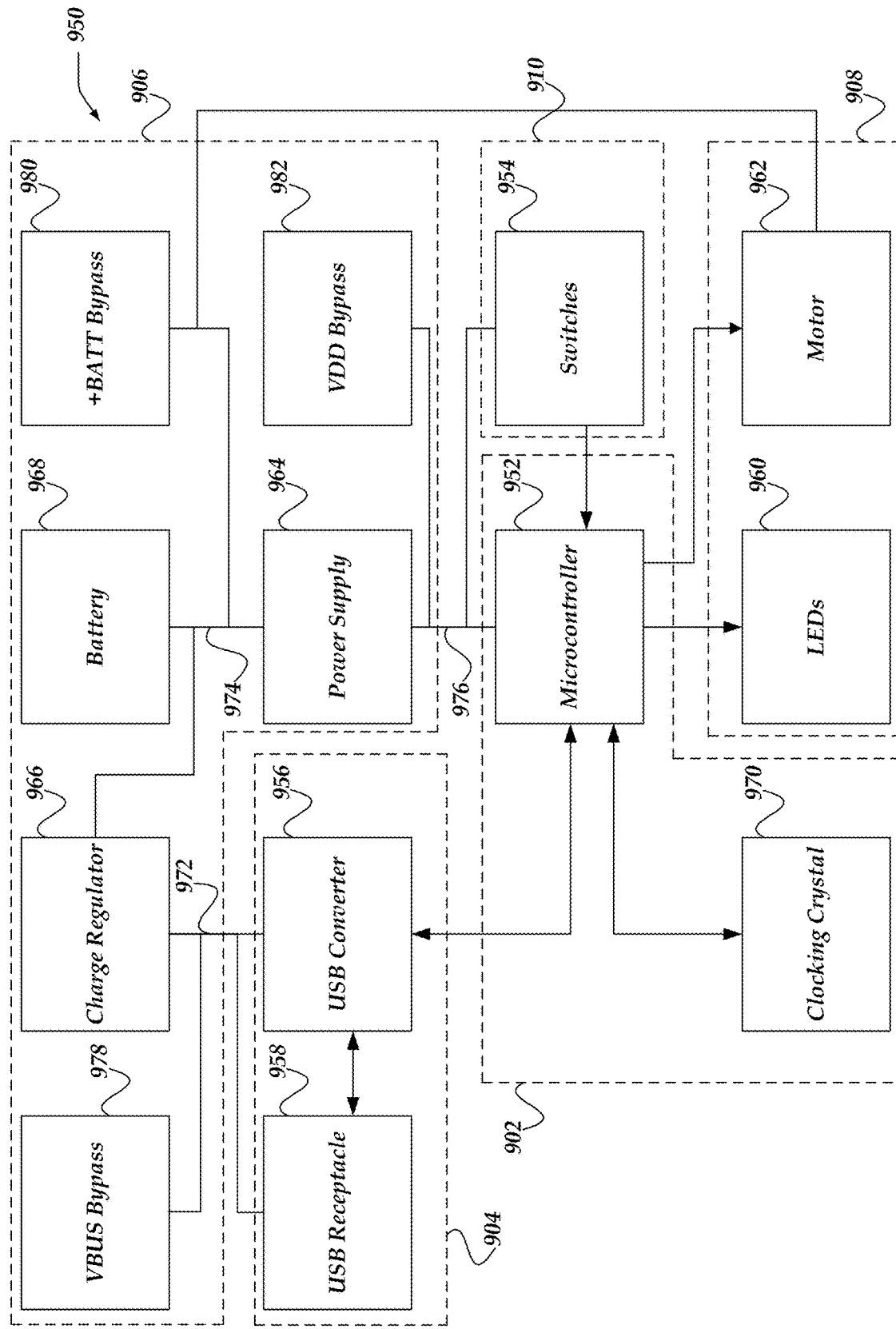
FIG. 9B illustrates a block diagram of example components usable with the wearable tracking computer of FIG. 1.
Figure 10:
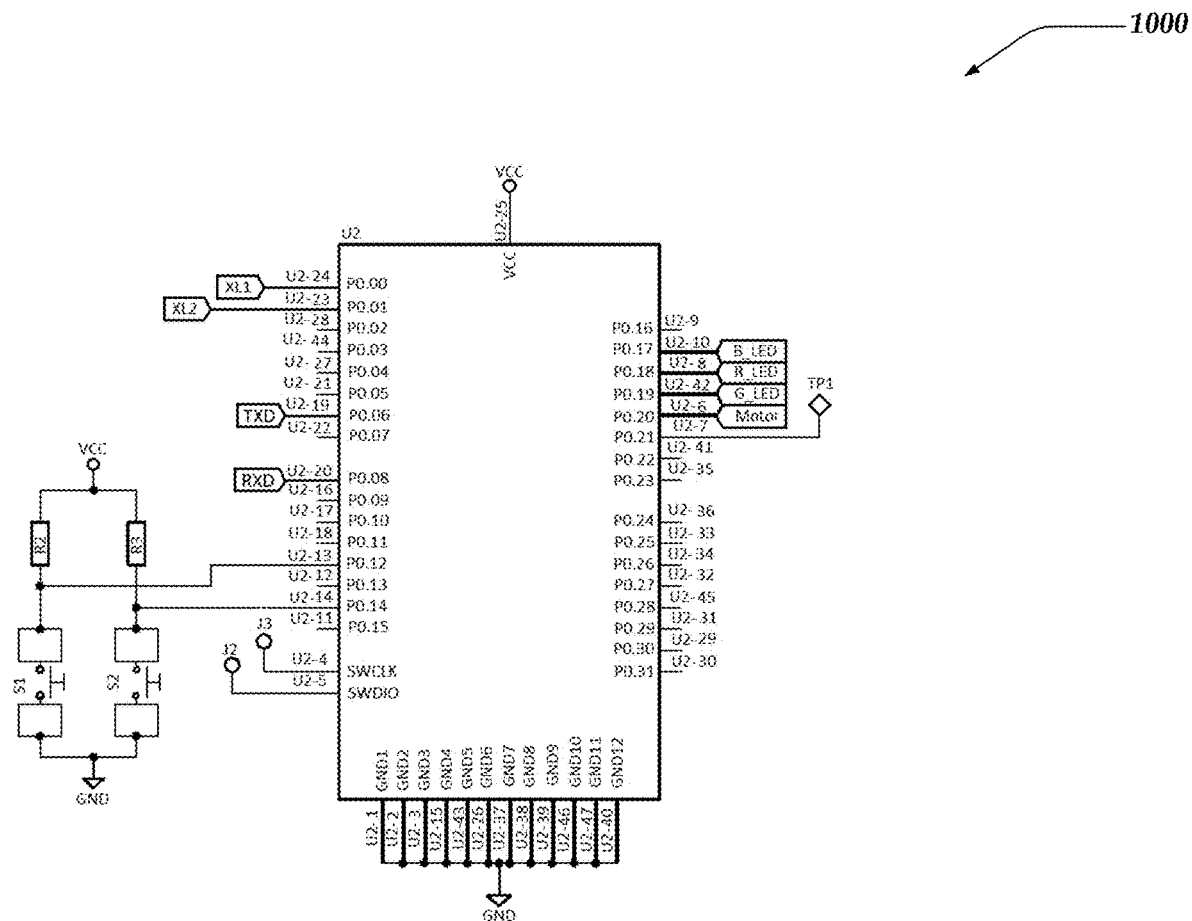
FIG. 10 shows a schematic representation of an example processing unit and user input control circuitry usable with the wearable tracking computer of FIG. 1.

At block 604, the wearable computer may determine whether the sensed actuation is associated with a first input control (for example, input control 404 of wearable tracking computer 116) or a second input control (for example, input control 406 of wearable tracking computer 116), as further discussed regarding FIGS. 9 and 10. If the second input control is actuated, control flows to block 606; otherwise, control flows to block 608.

At block 606, a timestamp data object is generated based on the sensed actuation of the second input control. At block 608, a timestamp data object is generated based on the sensed actuation of the first input control. The timestamp data object may include information that indicates a time at which the input control was actuated and information that indicates which input control was actuated. In some examples, the timestamp data object includes information that identifies the user or the wearable tracking computer. The timestamp data object and generation of the timestamp data object is further discussed regarding FIGS. 8-10.

In some examples, the wearable tracking computer provides feedback to the user based on the sensed actuation of the input control. The feedback may include one or more of audible, visual, or haptic feedback. The feedback may indicate which input control was actuated as further discussed regarding FIGS. 9, 10, 13, and 14. For example, wearable tracking computer 116 may have a first haptic actuator disposed in housing 402 at a location that facilitates stimulating a radius bone or an ulna bone of the user (for example, under user input control 404 to position the first haptic actuator between user input control 404 and the radius or ulna bone of the user) and a second haptic actuator disposed in housing 402 at another location that facilitates stimulating the other of the radius bone or the ulna bone of the user (for example, under user input control 406 to position the second haptic actuator between user input control 406 and the other of the radius or ulna bone of the user). In some examples, the first haptic actuator actuates responsive only to actuation of user input control 404, and the second haptic actuator actuates responsive only to actuation of user input control 406. Examples of haptic feedback provided by one or more of the first or second haptic actuators include vibration, electrical stimulation, or other stimulation. Examples of the first and second haptic actuators include user feedback circuitry 908 in FIG. 9A, Motor 962 in FIG. 9B, and circuitry 1400 in FIG. 14. The first haptic actuator may activate for a first predetermined time period (for example, three seconds) responsive to actuation of user input control 404 to provide therapeutic stimulation of the radius or ulna bone for the first predetermined time period, and the second actuator may activate for a second predetermined time period (for example, three seconds) responsive to actuation of user input control 406 to provide therapeutic stimulation of the other of the radius or ulna bone for the second predetermined time period. In some examples, the user may adjust the first or second predetermined time periods. Placing the first and second actuators respectively under user input controls 404, 406 facilitates the user experiencing haptic feedback at a position on the user's body that corresponds to a location of user input controls 404, 406, thereby facilitating increasing the correlation in the user's mind between actuation of user input controls 404, 406 and the haptic feedback. Information regarding therapeutic stimulation of the radius and ulna bones is further provided in U.S. Patent Publication No. 2007/0100262 issued to Simos et al., the entirety of which is incorporated herein by reference. These therapeutic functions provide particular benefit for addiction recovery and therapy.

At block 610, the wearable tracking computer provides the generated timestamp data object to a client computer, such as one or more of client computers 102-105. In other examples, the wearable tracking computer provides the generated timestamp data object directly to a network computer, such as application server computer 112 or timestamp modeling computer 114. The generated timestamp data object may be provided over a short-range wireless connection (for example, a connection that adheres to a standard designated with the mark BLUETOOTH®) or a direct physical connection. One or more generated timestamp data objects may be provided responsive to generation of each data object (for example, generate a data object and initiate transmission before completion of generating the next data object), after a predetermined quantity of data objects have been generated (for example, responsive to generating a predetermined number of data objects, transmitting the data objects), at one or more predetermined times (for example, at midnight each night, each Sunday, or other times), or responsive to user instruction via one or more input controls in the wearable tracking computer or the client computer. Next, control may be returned to a calling process.

Figure 7:
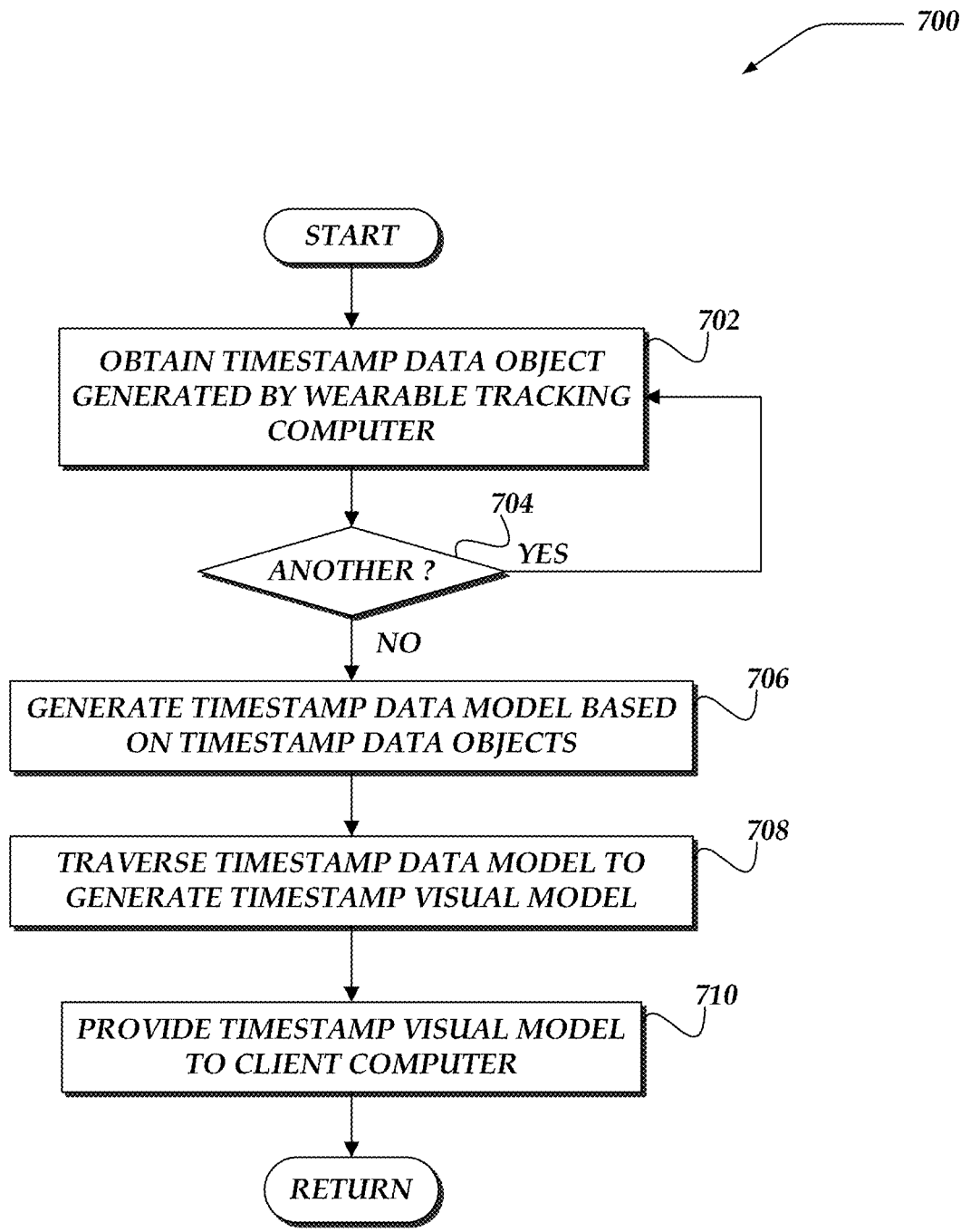
FIG. 7 shows an overview flow diagram of an example process for generating an example timestamp visual model.

FIG. 7 shows an overview flow diagram of example process 700 for generating an example timestamp visual model. One or more portions of process 700 may be performed by one or more engines in one or more wearable tracking computers, client computers, or timestamp modeling computers (for example, one or more metrics analysis engines 222 in one or more of client computers 102-105, wearable tracking computer 116, or others or one or more metrics analysis engines 326 in one or more of application server computer 112 or timestamp modeling computer 114). After a start block, at block 702, a timestamp data object generated by a wearable tracking computer is obtained. Preferably, a client computer obtains the timestamp data object from the wearable tracking computer (for example, as discussed regarding block 610 of FIG. 6) and provides the timestamp data object to a timestamp modeling computer. One or more generated timestamp data objects may be provided to the timestamp modeling computer responsive to the client computer obtaining each data object (for example, the client computer obtains a timestamp data object and initiates transmission to the timestamp modeling computer before completion of obtaining the next data object), after a predetermined quantity of data objects have been obtained by the client computer (for example, responsive to obtaining a predetermined number of data objects, transmitting the data objects to the timestamp modeling computer), at one or more predetermined times (for example, at midnight each night, each Sunday, or other times), or responsive to user instruction via one or more input controls in the client computer.

This approach is not well-understood, routine, nor conventional, especially in the art of tracking computers. Because the client computer obtains the timestamp data object from the wearable tracking computer and provides the timestamp data object to the timestamp modeling computer, the computational load and expenses that otherwise would have been incurred by the client computer or the wearable tracking computer are offloaded to the timestamp modeling computer, thereby improving the functionality of the client computer or the wearable tracking computer. Moreover, the timestamp modeling computer may have horizontal access across multiple, unrelated user accounts or devices, thereby facilitating the timestamp modeling computer to generate timestamp data models or timestamp visual models that are based on timestamp data objects to which the client computer or the wearable tracking computer lack access because the client computer and the wearable tracking computer may be limited to vertical access (for example, access only into information logically associated with the user, the client computer, or the wearable tracking computer). Accordingly, the approach of the timestamp modeling computer obtaining the timestamp data object from the client computer facilitates decreasing the computational expenses incurred by the client computer or the wearable tracking computer or facilitates generating and providing information (for example, timestamp data models or timestamp visual models) that the client computer or the wearable tracking computer may not be able to generate or provide.

At block 704, if another timestamp data object generated by the wearable tracking computer should be obtained, control returns to block 702; otherwise, control flows to block 706.

At block 706, one or more timestamp data models may be generated based on the obtained timestamp data objects. In some examples, one or more timestamp data models may be generated based on timestamp data objects from only one wearable tracking computer, associated with only one user (for example, timestamp data objects from one or more wearable tracking computers associated with a single user), or associated with a predetermined group of users (for example, timestamp data objects from one or more wearable tracking computers associated with users in a predefined group, such as a sports team, school class, family, or other groups). In other examples, one or more timestamp data models may be generated based on timestamp data objects associated with users or wearable tracking computers that have one or more common characteristics (for example, one or more characteristics indicated by one or more portions of demographics information, such as demographics information 312). In some examples, one or more timestamp tracking engines (for example, timestamp tracking engine 318) or metrics analysis engines (for example, metrics analysis engine 326) may execute one or more portions of block 706. Timestamp data models are further discussed regarding FIG. 8.

At block 708, one or more timestamp data models may be traversed to generate one or more timestamp visual models. Timestamp visual models may provide visual comparisons of quantities of timestamp data objects of a given entry type over time for the user, across multiple users having one or more characteristics in common with the user, or multiple generic users (for example, average quantities across all users). Timestamp visual models may provide visual comparisons of quantities of timestamp data objects of a given entry type generated at specific times, such as particular days of the week, particular times of day, or other times. Timestamp visual models may be provided in a variety of forms, such as bar charts, pie graphs, line graphs, or other forms. In some examples, one or more metrics analysis engines (for example, metrics analysis engine 326) may execute one or more portions of block 708.

At block 710, the one or more timestamp visual models may be provided to the client computer or another client computer to facilitate the user viewing the one or more timestamp visual models. For example, the client computer may execute a timestamp tracking engine (for example, timestamp tracking engine 218) that obtains the timestamp data object from the wearable tracking computer and provides the timestamp data object to the timestamp modeling computer, and the client computer may execute a metrics analysis engine (for example, metrics analysis engine 222) that obtains and provides the timestamp visual model from the timestamp modeling computer. Alternatively, instead of the user viewing one or more portions of the timestamp visual model on the client computer, the user may visit a predetermined website with another client computer, the user may log into an account that is logically associated with the user, and the other client computer may execute the metrics analysis engine to provide the timestamp visual model to the user. Next, control may be returned to a calling process.

Figure 8:
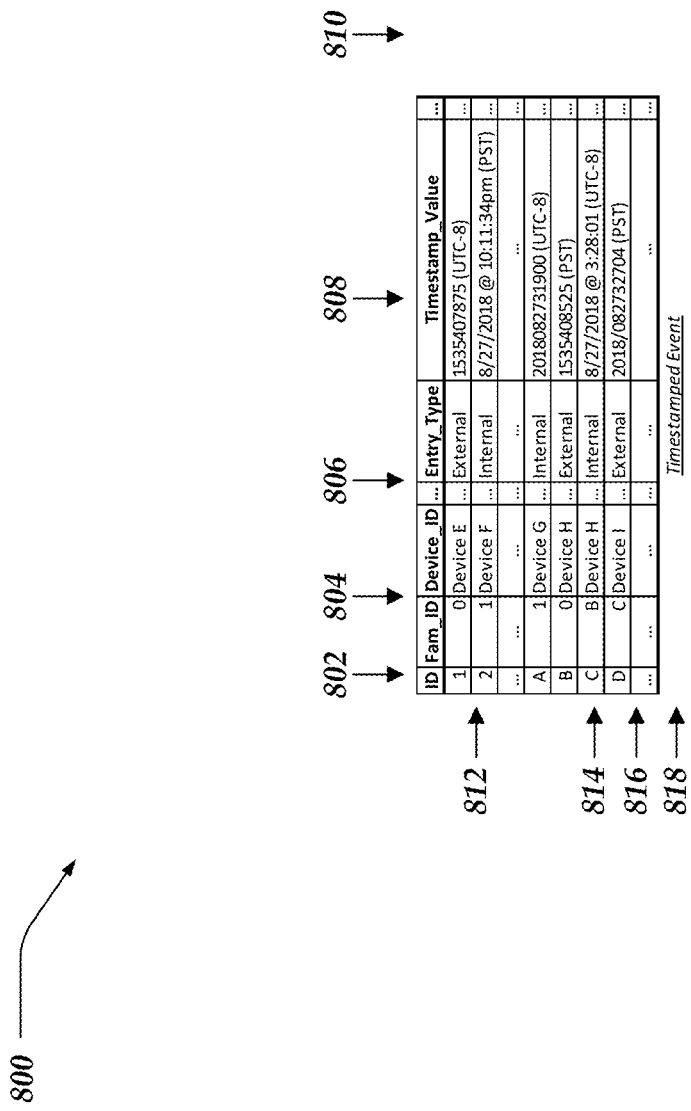
FIG. 8 illustrates a logical representation of an example timestamp data model.

FIG. 8 illustrates a logical representation of example timestamp data model 800. A wearable tracking computer, client computer, or timestamp modeling computer may generate a timestamp data model, such as timestamp data model 800. Timestamp data model 800 may include one or more timestamp data objects (for example, records or other data objects) that include information associated with one or more timestamp events, such as actuation of one or more user input controls (for example, user input control 404, user input control 406, or other user input controls). Timestamp data model 800 may include a number of named attributes, such as ID 802, Family_ID 804, Device_ID 806, Entry_Type 808, Timestamp_Value 810, or other attributes. The values for identifiers, such as those shown as entries for attribute 802 or other attributes may be sequential numbers, non-sequential numbers, strings, or other data types. In the example shown in FIG. 8, each data object may be defined or characterized by one or more values associated with the named attributes. For example, data object 812 with ID of "1" has Family_ID of "0", Device_ID of "Device E", Entry_Type of "External", and Timestamp_Value of "1535407875 (UTC-8)".

If timestamp data model 800 involves hierarchies (for example, trees or others for one or more portions of one or more models, sub-models of one or more models, or others), nested data models or objects, or other relationships, Family_ID values associated with attribute 804 may reference ID values associated with attribute 802 or others. Accordingly, timestamp data model 800 may define relationships without referencing a separate model or data object. Examples of relationships may include being associated with the same or related user characteristics, portions of user characteristics, sets of user characteristics, purposes, activities, geographic or logical territories, supervisory entities (for example, coach, doctor, parent, teacher, or others), or others.

In the example shown in FIG. 8, timestamp data object 812 represents a timestamped event that is associated with no parent timestamp data objects, Device E, an external stimulus, a timestamp value provided as an epoch (for example, a Unix timestamp), or other information. In contrast, in the example illustrated in FIG. 8, timestamp data object with ID of A has Family_ID of "1", Device_ID of "Device G", Entry_Type of "Internal", and a timestamp value provided as a date value and a time value combined as a single number. Accordingly, timestamp data object 814 may represent a timestamp event that is in the same family as the timestamp event of timestamp data object 812. For example, timestamp data object 812 and timestamp data object 814 may be associated with the same user and different devices. Also in the example shown in FIG. 8, timestamp data object 816 represents a timestamped event that is associated with no parent timestamp data objects, Device H, an external stimulus, a timestamp value provided as an epoch, or other information. In the example illustrated in FIG. 8, timestamp data object 818 represents a timestamped event that is associated with the timestamped event of time stamp data object 816, Device H, internal stimulus, a timestamp value provided as a date value and a time value, or other information.

Multiple data objects in timestamp data model 800 may form one or more portions or sub-models, as defined by one or more of the attributes, such as Family_ID 804. Timestamp data model 800 (in entirety or one or more model portions or sub-models in timestamp data model 800) may be traversed by executing one or more processes or actions defined by one or more configuration files, rules, custom scripts, or others. One or more model portions or sub-models may be selected when traversing timestamp data model 800 based on one or more characteristics or conditions (or ranges of characteristics or conditions) associated with one or more elements being evaluated. For example, one or more timestamp data objects may be selected based on the one or more timestamp data objects having one or more timestamp values that fall within a selected time window, one or more entry types that match one or more selected criteria, a user or device logic association that matches one or more selected criteria (for example, a list of one or more users or devices or a list of one or more user or device characteristics, such as demographics characteristics), or other characteristics. In some examples, a hierarchy in timestamp data model 800 may be represented by one or more values in Family_ID attribute 804. In some examples, one or more model portions or sub-models may be associated with multiple paths within timestamp data model 800. Accordingly, timestamp data model 800 may facilitate dynamically selecting one or more models, model portions, or sub-models based on one or more characteristics or conditions of one or more elements or phases in one or more processes, actions, control sessions, or others, thereby facilitating improving computational performance, reliability, consistency when updates are provided, or others.

In other examples, system 100 may include one or more repositories that include one or more data models for each user, group of users, element, or group of element in or associated with system 100. Each element type (for example, computers, control sessions, interactions, actions, metrics, or others) may have a dedicated repository that includes data objects for each element of the element type. Each data object for each element may have attributes that correspond to features or characteristics of the element type of the element. For clarity, timestamp data model 800 is shown using tabular format. In other examples, data models, data sets, or data objects may be arranged differently, such as using different formats, data structures, objects, or others. For example, timestamp data model 800 may be structured as a JSON object (for example, a JSON tree or others).

FIG. 9A shows a block diagram of example physical components 900 that are usable with a wearable tracking computer, such as wearable tracking computer 116. As shown in FIG. 9A, components 900 may include processing unit 902 to execute one or more portions of processes 600 or 700. Examples of processing unit 902 may include one or more CPUs or microcontrollers. In some examples, the one or more microcontrollers directly execute their own embedded logic to perform actions and access their own internal memory and their own external Input and Output Interfaces (e.g., hardware pins or wireless transceivers) as a System On a Chip (SOC) or others. An example of processing unit 902 is further discussed regarding FIG. 10.

Physical components 900 may also include client device interface circuitry 904 in bidirectional communication with processing unit 902. Client device interface circuitry 904 may facilitate a physical or wireless connection directly or indirectly with a client device, such as one or more of client computers 102-105. Client device interface circuitry 904 may facilitate downloading information (for example, software or firmware updates, configuration or settings information, or other information) to processing unit 902 and may facilitate uploading information (for example, one or more timestamp data objects, timestamp data models, timestamp visual models, or other information) to the client device. Client device interface circuitry 904 may be in electrical communication with power supply circuitry 906 to facilitate charging a power source in the wearable tracking computer as further discussed regarding FIGS. 15-18.

Power supply circuitry 906 may provide power to processing unit 902 and one or more other components, such as user feedback circuitry 908 and user input interface 910. User feedback circuitry 908 may provide feedback (for example, visual, audible, or haptic feedback) to the user of the wearable tracking computer responsive to actuation signals from processing unit 902 as further discussed regarding FIGS. 13 and 14.

User input interface 910 includes one or more user input controls. Actuation of the one or more user input controls may initiate a signal to be sent to processing unit 902 to facilitate processing unit 902 performing one or more actions responsive to the actuation. Preferably, one or more user input controls are dedicated to initiating generation of timestamp data objects, such as one or more of input control 404 or input control 406.

Although the components illustrated in FIG. 9A are shown as separate and distinct from each other, some examples of physical components 900 implement one or more portions of one or more of the components as part of or integral to one or more other components in physical components 900. For example, processing circuitry 900 may include wireless client device interface circuitry that conforms to a wireless standard identified under the mark BLUETOOTH®.

FIG. 9B illustrates a block diagram of example physical components 950 that are usable with an example wearable tracking computer, such as wearable tracking computer 116. As shown in FIG. 9B, components 950 may include microcontroller 952, switches 954, universal serial bus (USB) converter 956, USB receptacle 958, light emitting diodes (LEDs) 960, haptic motor 962, power supply 964, charge regulator 966, battery 968, and clocking crystal 970. In FIG. 9B, the lines having arrows represent communication connections, and the lines lacking arrows represent power connections. For example, USB converter 956, USB receptacle 958, and charge regulator 966 are connected to VBUS 972 to facilitate providing power to charge regulator 966 from a USB cable and supplying power to USB converter 956. Motor 962, power supply 964, charge regulator 966, and battery 968 are connected to +BATT 974 to facilitate charging battery 968 and supplying power to motor 962 and power supply 964. Processing unit 902 and power supply 964 may be connected to VDD 976 to facilitate providing power to processing unit 902. Processing unit 902 may provide power to one or more of components 950, such as LEDs 960 or clocking crystal 970, through one or more communication connections. One or more bypass circuits may shunt noise on the power connections, such as noise caused by one or more portions of components 950. VBUS bypass 978 shunts noise on VBUS 972, +BATT bypass 980 shunts noise on +BATT 974, and VDD bypass 982 shunts noise on VDD 976. Each block in components 950 is also connected to ground (not shown).

In FIG. 9B, the boxes having dashed borders represent the components shown in FIG. 9A. For example, microcontroller 952 and clocking crystal 970 are an example of processing unit 902. Switches 954 are an example of user input interface 910 of FIG. 9A. USB converter 956 and USB receptacle 958 are an example of client device interface circuitry 904 of FIG. 9A. LEDs 960 and haptic motor 962 are an example of user feedback circuitry 908. Power supply 964, charge regulator 966, battery 968, VBUS bypass 978, +BATT bypass 980, and VDD bypass 982 are examples of power supply circuitry 906.

FIG. 10 illustrates a schematic representation of example circuitry 1000 with an example processing unit and example user input controls of an example wearable tracking computer, such as wearable tracking computer 116. An example of the processing unit may include manufacturer part number BMD-350-A-R and descriptor of MOD BLE 4.2 NORDIC NRF52832 SOC from the manufacturer RIGADO INC., with a datasheet entitled "BMD-300 Series Module for Bluetooth 5 LE" (available at www.rigado.com followed by "/?wpdmdl=1441"), the entirety of which is incorporated herein by reference. For purposes of this description, each pin of the processor unit is prefaced with "U2" to distinguish from pin numbers in other figures. Pins U2-24 and U2-23 may be connected to clocking circuitry, such as circuitry 1900 in FIG. 19. Pins U2-19 and U2-20 may be connected to client device interface circuitry, with the process unit transmitting data with pin U2-19 and obtaining data with pin U2-20. Pin U2-13 may be used to detect actuation of a first user input control, such as switch S1. Pin U2-14 may be used to detect actuation of a second user input control, such as switch S2. Pins U2-4 and U2-5 may be used to test proper functioning of the wearable tracking computer. Pins U2-10, U2-8, U2-42, and U2-6 may be used to actuate user feedback circuitry, such as circuitry 1300 in FIG. 13 or circuitry 1400 in FIG. 14. Pin U2-7 may be used to test proper functioning of the wearable tracking computer. Pin U2-25 may be connected to VCC. Pins U2-1, U2-2, U2-3, U2-15, U2-43, U2-26, U2-37, U2-38, U2-39, U2-46, U2-47, and U2-40 may be connected to ground. The processing unit in FIG. 10 is an example of processing unit 902 in FIGS. 9A and 9B.

An example of switches S1 and S2 may include a single pull single throw switch, such as a switch with the manufacturer part number of TL6330AF200Q from the manufacturer of E-SWITCH, with a datasheet entitled "TL6330AF200Q" (available at spec_sheets.e-switch.com followed by "/specs/P006330.pdf"), the entirety of which is incorporated herein by reference. Preferably, one or both of switches S1 or S2 are dedicated to initiating generation of timestamp data objects by the processing unit. One side of each switch may be connected to ground, and the other side of each switch may be connected to a resistor disposed between the switch and VCC. As shown in FIG. 10, resistor R2 is disposed between switch S1 and VCC, and resistor R3 is disposed between switch S2 and VCC. An example of resistors R2 and R3 may include 10,000-ohm resistors. The user input controls S1 and S2 with resistors R2 and R3 in FIG. 10 are examples of user input interface 910 in FIG. 9A and switches 954 in FIG. 9B.

Figure 11:
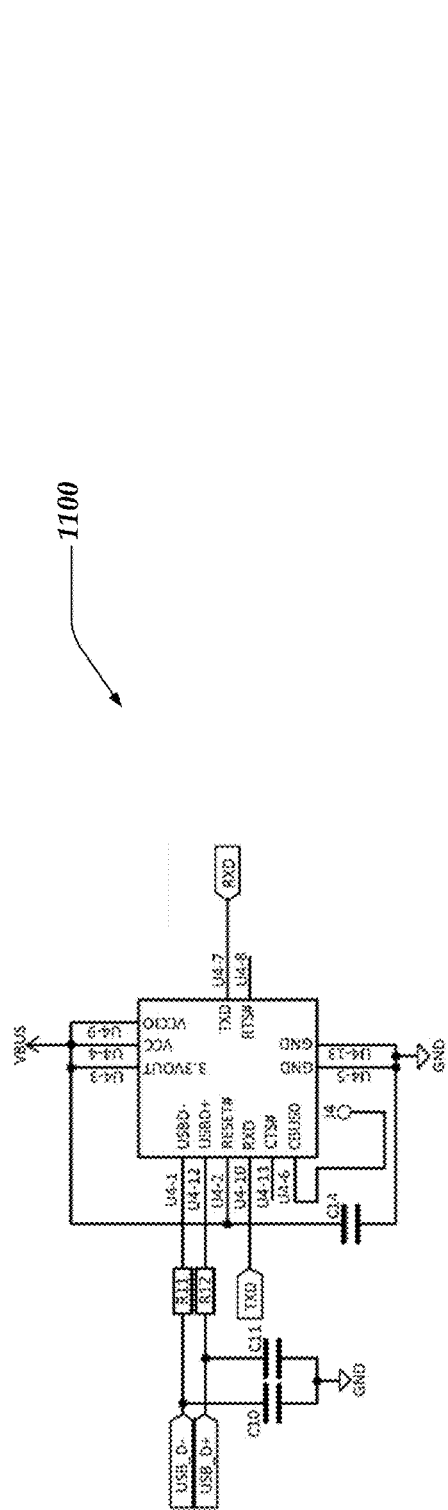
FIG. 11 illustrates a schematic representation of an example conversion circuitry usable with the wearable tracking computer of FIG. 1.

FIG. 11 shows a schematic representation of example conversion circuitry 1100, and Conversion circuitry 1100 may an integrated circuit that provides a USB to serial UART interface, such as an integrated circuit having manufacturer part number FT234XD-R from the manufacturer FTDI FUTURE TECHNOLOGY DEVICES INTERNATIONAL LTD, with a datasheet entitled "FT 234XD (USB to BASIC UART IC)" (available at www.ftdichip.com followed by "/Support/Documents/DataSheets/ICs/DS_FT234XD.pdf"), the entirety of which is incorporated herein by reference. For purposes of this description, each pin of the integrated circuit is prefaced with "U4" to distinguish from pin numbers in other figures.

Pins U4-2, U4-3, U4-4, and U4-9 of the integrated circuit of conversion circuitry 1100 may be connected to VBUS. A capacitor C14 (for example, a 0.1 µF capacitor) may be disposed between VBUS and ground. Pins U4-5 and U4-13 may be connected to ground. Pin U4-1 may be connected to a low differential voltage data pin of a USB connection receptacle (for example, the USB connection receptacle shown in FIG. 12), and pin U4-12 may be connected to a high differential voltage data pin of the USB connection receptacle. Resistor R11 may be disposed between the low differential voltage data pins, and resistor R12 may be disposed between the high differential voltage data pins. Examples of resistors R11 and R12 may include 27-ohm resistors. Bypass capacitors C10 and C11 may be respectively disposed between the low and high differential voltage lines and ground. Examples of capacitors C10 and C11 may include 1 pF capacitors. Pin U4-10 may receive signals from the processing unit (for example, pin U2-19), and pin U4-7 may provide signals to the processing unit (for example, pin U2-20). Pins U4-10 and U4-7 may be used to transfer information to and from a client computer and the wearable tracking computer. Pin U4-6 may be used to test proper functioning of the wearable tracking computer. Conversion circuitry 1100 is an example of USB converter 956 in FIG. 9B and a portion of client device interface circuitry 904 in FIG. 9A.

Figure 12:
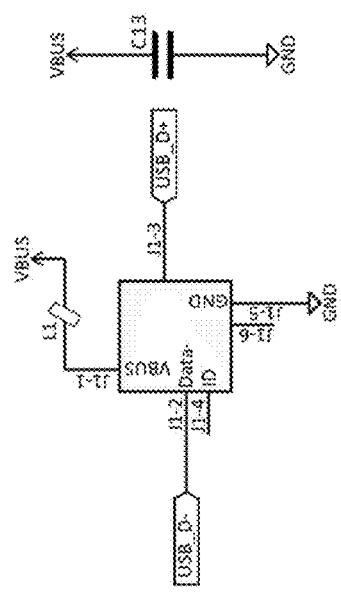
FIG. 12 shows a logical representation of an example network interface circuitry usable with the wearable tracking computer of FIG. 1.

FIG. 12 illustrates a logical representation of example network interface circuitry 1200. Network interface circuitry 122 may include a USB connection receptacle that receives a USB cable connected to a client computer, such as a micro USB B-type receptacle having manufacturer part number 10118194-0001LF from the manufacturer AMPHENOL FCI, with a datasheet entitled "MICRO USB B TYPE RECEPTACLE" (available at cdn.amphenol-icc.com followed by "/media/wysiwyg/files/drawing/10118194.pdf"), the entirety of which is incorporated herein by reference. For purposes of this description, each pin of the USB connection receptacle is prefaced with "J1" to distinguish from pin numbers in other figures.

Pin J1-1 of the USB connection receptacle may be connected to VBUS, with an inductive circuit L1 disposed between pin J1-1 and VBUS. An example of the inductive circuit L1 may include a ferrite bead having a manufacturer part number BLM15HG601SN1D from the manufacturer MURATA, with a datasheet entitled "GHz Noise Suppression Chip Ferrite Bead" (available at www.murata.com followed by "/en-global/products/productdata/8796740223006/ENFA0024.pdf"), the entirety of which is incorporated herein by reference. Pin J1-2 may be connected to a low differential voltage data pin of a USB to serial UART interface, such as the interface of FIG. 11. Pin J1-5 may be connected to ground. Pin J1-3 may be connected to a high differential voltage data pin of the interface. In some examples, bypass capacitor C13 may be disposed between VBUS and ground. An example of capacitor C13 may include a 4.7 µF capacitor. The USB receptacle of the network interface circuitry 1200 is an example of USB receptacle 958 of FIG. 9B and a portion of client device interface circuitry 904 of FIG. 9A. Bypass capacitor C13 is an example of VBUS bypass 978 in FIG. 9B and a portion of power supply circuitry 906 in FIG. 9A.

Figure 13:
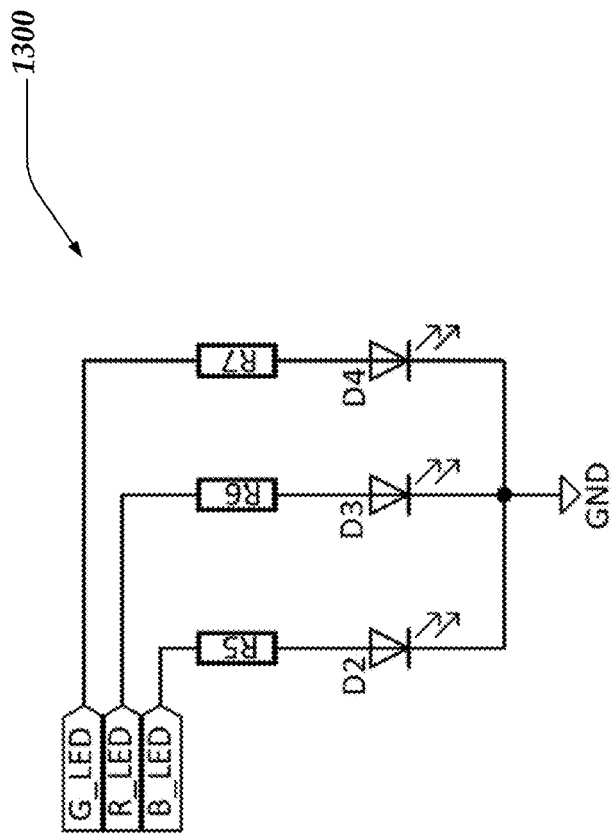
FIG. 13 illustrates a logical representation of an example visual feedback circuitry usable with the wearable tracking computer of FIG. 1.

FIG. 13 shows a logical representation of example visual feedback circuitry 1300 of the wearable tracking computer. Visual feedback circuitry 1300 may include one or more light emitting diodes (LEDs), such as one or more of LEDs D2, D3, or D4. In some examples, LED D2 may include a green LED, LED D3 may include a red LED, and LED D4 may include a blue LED. LED D2 may be connected to pin U2-42 of the processing unit, LED D3 may be connected to pin U2-8, and LED D4 may be connected to pin Us-10 of the processing unit. Resistors R5, R6, and R7 may be disposed between LEDs D2, D3, and D4 and the processing unit. An example of resistors R5 and R6 may include 120-ohm resistors, and an example of resistor R7 may include a 33-ohm resistor. Visual feedback circuitry 1300 is an example of LEDs 960 in FIG. 9B and a portion of user feedback circuitry 908.

Figure 14:
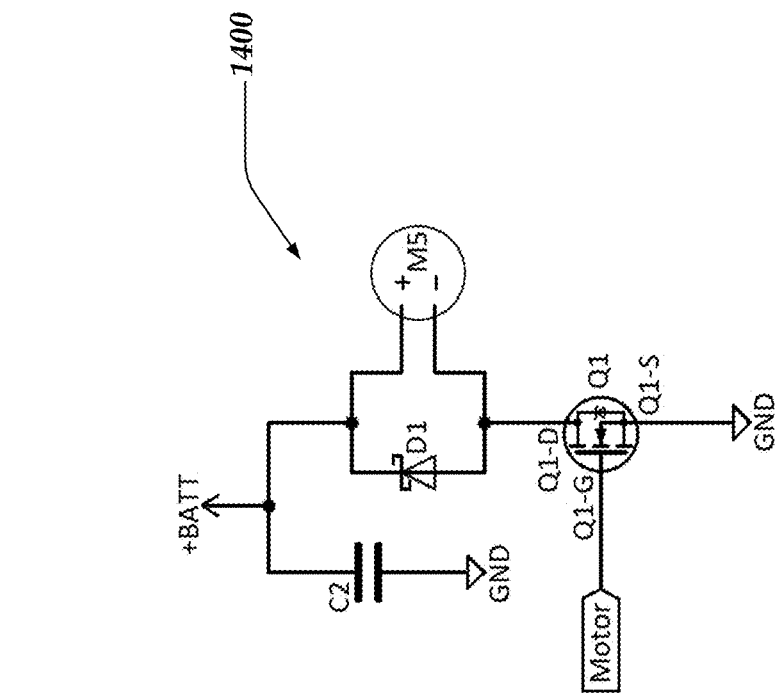
FIG. 14 shows a schematic representation of an example haptic feedback circuitry usable with the wearable tracking computer of FIG. 1.

FIG. 14 illustrates a schematic representation of example haptic feedback circuitry 1400 of the wearable tracking computer. Haptic feedback circuitry 1400 may include one or more haptic motors, such as haptic motor M5. In some examples, motor M5 may include a vibration motor having manufacturer part number 316040004 from the manufacturer SEEED TECHNOLOGY CO. LTD., with a datasheet entitled "PRODUCT SPECIFICATION—1027" (available at media.digikey.com followed by "/pdf/Data%20Sheets/Seeed%20Technology/1027_Spec.pdf"), the entirety of which is incorporated herein by reference. A positive terminal of motor M5 may be connected to positive battery voltage +BATT, and a negative terminal of motor M5 may be connected to a drain of an N-channel MOSFET, such as drain Q1-D of N-channel MOSFET Q1. For purposes of this description, each pin of MOSFET Q1 is prefaced with "Q1" to distinguish from other pin numbers. In some examples, MOSFET Q1 may include an N-channel MOSFET having manufacturer part number RK7002BM from the manufacturer ROHM SEMICONDUCTOR, with a datasheet entitled "rk7002bmt116-e_.pdf" (available at www.rohm.com followed by "/datasheet/RK7002BM/rk7002bmt116-e"), the entirety of which is incorporated herein by reference. Source Q1-S of MOSFET Q1 may be connected to ground. Gate Q1-G of MOSFET Q1 may be connected to pin U2-6 of the processing unit. A barrier diode may be disposed in parallel with motor M5 between the positive battery voltage and MOSFET Q1. In some examples, the barrier diode may include Shottky barrier diode D1 having manufacturer part number RB521S30T1G from the manufacturer ON SEMICONDUCTOR, with a datasheet entitled "Schottky Barrier Diode" (available at www.onsemi.com followed by "/pub/

Collateral/RB521S30T1-D.PDF"), the entirety of which is incorporated herein by reference. A bypass capacitor, such as capacitor C2, may be disposed between the positive battery voltage and ground. In some examples, capacitor C2 may include a 1 µF capacitor. Bypass capacitor C2 is an example of a portion of +BATT bypass 980 in FIG. 9B and a portion of power supply circuitry 906 in FIG. 9A. The remainder of haptic feedback circuitry 1400 is an example of motor 962 in FIG. 9B and a portion of user feedback circuitry 908 in FIG. 9A.

FIG. 15 shows a schematic representation of example power supply circuitry 1500 of the wearable tracking computer. Power supply circuitry 1500 may include a voltage converter, such as DC-to-DC converter U3. For purposes of this description, each pin of converter U3 is prefaced with "U3" to distinguish from other pin numbers. In some examples, converter U3 may include a buck-boost converter having manufacturer part number TPS63001DRCR from the manufacturer TEXAS INSTRUMENTS, with a datasheet entitled "TPS6300x High-Efficient Single Inductor Buck-Boost Converter With 1.8-A Switches" (available at www.ti-.com followed by "/lit/ds/symlink/tps63001.pdf"), the entirety of which is incorporated herein by reference.

Pins U3-4 and U3-2 may be connected to each other with inductor L2 disposed between pins U3-4 and U3-2. In some examples, inductor L2 may include a 2.2 µH inductor. Pins U3-5, U3-8, and U3-7 may be connected to positive battery voltage +BATT. Pins U3-1 and U3-10 may be connected to voltage VDD. Pins U3-11, U3-9, and U3-3 may be connected to ground. Bypass capacitor C7 (for example, a 10 µF capacitor) may be disposed between the positive battery voltage and ground. Bypass capacitor C8 (for example, a 33 g capacitor) may be disposed between voltage VDD and ground. Testing points TP2, TP4, and TP8 may be used to test proper functioning of the wearable tracking computer. P-channel MOSFET Q2B having source Q2B-S, drain Q2B-D, and gate Q2B-G may be disposed between the positive battery voltage and pin U3-6. N-channel MOSFET Q2A having source Q2A-S, drain Q2A-D, and gate Q2A-G may be disposed between n-channel MOSFET Q2B and switch S3 (for example, a single pull, single throw switch). Actuating switch S3 may toggle the wearable tracking computer between off and on states. Resistors R4, R8, and R10 may include 100 k-ohm resistors. Resistor R9 may include a 1 M-ohm resistor. Capacitor C9 may include a 1 µF capacitor. Diode D5 may include a high conductance fast switching diode. Bypass capacitor C7 is an example of a portion of +BATT bypass 980 in FIG. 9B and a portion of power supply circuitry 906 in FIG. 9A. Bypass capacitor C8 is an example of a portion of VDD bypass 982 in FIG. 9B and a portion of power supply circuitry 906 in FIG. 9A. The remainder of power supply circuitry 1500 is an example of power supply 964 in FIG. 9B and a portion of power supply circuitry 906 in FIG. 9A.

FIG. 16 illustrates a logical representation of example charging regulator circuitry 1600 of the wearable tracking computer. Charging regulator circuitry 1600 may include charge management controller U1. For purposes of this description, each pin of charge management controller U1 is prefaced with "U1" to distinguish from other pin numbers. In some examples, charge management controller U1 may include an integrated charge management controller having manufacturer part number MCP73811T-420I/OT from the manufacturer MICROCHIP TECHNOLOGY, with a datasheet entitled "Simple, Miniature Single-Cell, Fully Integrated Li-Ion/Li-Polymer Charge Management Controllers" (available at www.microchip.com followed by "/my-microchip/filehandler.aspx?ddocname=en528273"), the entirety of which is incorporated herein by reference. Pins U1-1 and U1-4 may be connected to voltage bus VBUS. Pin U1-3 may be connected to positive battery voltage +BATT. Pin U1-2 may be connected to ground. Pin U1-5 may be connected to ground through resistor R1 (for example, a 10 k-ohm resistor). Bypass capacitor C1 (for example, a 4.7 µF capacitor) may be disposed between voltage bus VBUS and ground. Bypass capacitor C1 is an example of a portion of VBUS bypass 978 in FIG. 9B and a portion of power supply circuitry 906 in FIG. 9A. The remainder of charging regulator circuitry 1600 is an example of charge regulator 966 in FIG. 9B and a portion of power supply circuitry 906 in FIG. 9A.

FIG. 17 shows a logical representation of example power source 1700 of the wearable tracking computer. Power source 1700 may include rechargeable battery BT1. In some examples, battery BT1 ma FIG. 18 illustrates a schematic representation of an example bypass circuitry of an example wearable computer y include a 3.7-volt lithium battery rated at 110 mAh. Power source 1700 is an example of battery 968 in FIG. 9B and a portion of power supply circuitry 906 in FIG. 9A.

FIG. 18 illustrates a schematic representation of example bypass circuitry 1800 of the wearable tracking computer. Bypass circuitry 1800 may include one or more capacitors, such as capacitor C3 (for example, a 0.1 µF capacitor) and capacitor C4 (for example, a 4.7 µF capacitor) disposed between voltage VDD and ground. Bypass circuitry 1800 is an example of a portion of VDD bypass 982 in FIG. 9B and a portion of power supply circuitry 906 in FIG. 9A.

Figure 19:
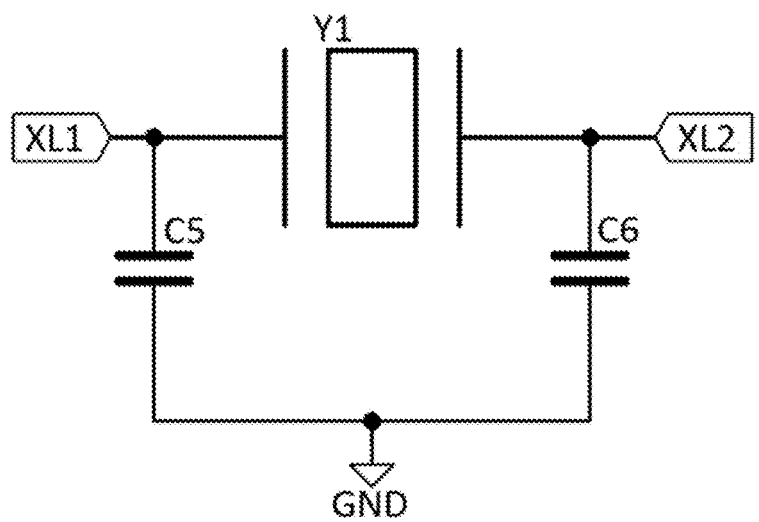
FIG. 19 illustrates a schematic representation of an example clocking circuitry usable with the wearable tracking computer of FIG. 1.

FIG. 19 shows a schematic representation of example clocking circuitry 1900 of the wearable tracking computer. Clocking circuitry 1900 may include crystal Y1, with one terminal of crystal Y1 connected to pin U2-24 and the other terminal of crystal Y1 connected to pin U2-23. In some examples, crystal Y1 may include a low profile crystal having manufacturer part number ABS07-32.768KHZ-7-T from the manufacturer ABRACON, with a datasheet entitled "32.768 kHz SMD LOW PROFILE CRYSTAL" (available at www.snapeda.com followed by "/parts/ABS07-32.768KHZ-7-T/Abracon/datasheet/"), the entirety of which is incorporated herein by reference. One or more decoupling capacitors may be disposed between one or both of the terminals of crystal Y1, such as capacitors C5 and C6 (for example, 19 pF capacitors). Clocking circuitry 1900 is an example of clocking crystal 970 in FIG. 9B.

It will be understood that each block of the flowchart illustration, and combinations of blocks in the flowchart illustration, can be implemented by computer program instructions. These program instructions may be provided to one or more processors to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowchart to be performed in parallel or concurrently by the one or more processors or one or more computers. Moreover, some of the steps may also be performed across more than one processor or computer. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an embodiment of one or more of the various embodiments of the invention. Moreover, one or more portions of one or more embodiments may be modified without departing from the invention.

Further, in one or more embodiments (not shown in the figures), the logic in the illustrative flowcharts may be executed using one or more embedded logic hardware devices instead of one or more CPUs, such as an Application Specific Integrated Circuits (ASICs), Field Programmable Gate Arrays (FPGAs), Programmable Array Logic chips (PALs), or others. The embedded one or more logic hardware devices may directly execute their embedded logic to perform actions. In at least one embodiment, one or more microcontrollers may be arranged as system-on-a-chip (SOCs) to directly execute their own locally embedded logic to perform actions and access their own internal memory and their own external Input and Output Interfaces (e.g., hardware pins or wireless transceivers) to perform actions described herein.

What is claimed is:

1. A wearable tracking computer, comprising:
   a wearable housing;
   a first user input control;
   a second user input control;
   a first haptic actuator disposed in the wearable housing and configured to haptically stimulate one of a radius bone or an ulna bone of a wearer responsive to actuation of the first user input control; and
   a second haptic actuator disposed in the wearable housing and configured to haptically stimulate another of the radius bone or the ulna bone of the wearer responsive to actuation of the second user input control,
   wherein only the first haptic actuator of the first and second haptic actuators is configured to actuate in response to the wearer actuating the first user input control,
   wherein only the second haptic actuator of the first and second haptic actuators is configured to actuate in response to the wearer actuating the second user input control,
   wherein the first and second user input controls are configured to be consciously activated by the wearer.

2. The wearable tracking computer of claim 1, wherein the wearable housing is devoid of a liquid crystal display ("LCD").

3. The wearable tracking computer of claim 1, wherein the first haptic actuator is positioned in the wearable housing to haptically stimulate the one of the radius bone or the ulna bone, and the second haptic actuator is positioned in the wearable housing to haptically stimulate the other of the radius bone or the ulna bone.

4. The wearable tracking computer of claim 1, wherein the first haptic actuator is positioned in the wearable housing to align with the one of the radius bone or the ulna bone, and the second haptic actuator is positioned in the wearable housing to align with the other of the radius bone or the ulna bone.

5. The wearable tracking computer of claim 1, wherein the first haptic actuator is positioned in the wearable housing under the first user input control to haptically stimulate the one of the radius bone or the ulna bone, and the second haptic actuator is positioned in the wearable housing under the second user input control to haptically stimulate the other of the radius bone or the ulna bone.

6. The wearable tracking computer of claim 1, wherein the first user input control is a first button, and the second user input control is a second button.

7. The wearable tracking computer of claim 1, further comprising an accelerometer sensor disposed in the wearable housing, wherein a first gesture detected by the accelerometer sensor actuates the first user input control, and a second gesture detected by the accelerometer sensor actuates the second user input control.

8. The wearable tracking computer of claim 1, further comprising:
   a processing unit disposed in the housing, the processing unit being configured to indicate first locations of the wearable housing when the wearer actuated the first user input control and second locations of the wearable housing when the wearer actuated the second user input control; and
   interface circuitry disposed in the wearable housing, the interface circuitry being configured to communicate the first locations and the second locations to a client computer.

9. A method of using a wearable tracking computer, comprising:
   providing a wearable tracking computer that comprises:
      a wearable housing;
      a first user input control;
      a second user input control;
      a first haptic actuator disposed in the wearable housing and configured to haptically stimulate one of a radius bone or an ulna bone of a wearer responsive to actuation of the first user input control; and
      a second haptic actuator disposed in the wearable housing and configured to haptically stimulate another of the radius bone or the ulna bone of the wearer responsive to actuation of the second user input control;
   actuating by the wearer while the wearer is awake the first user input control responsive to an external stimulus;
   actuating only the first haptic actuator of the first and second haptic actuators in response to the wearer actuating the first user input control;
   actuating by the wearer while the wearer is awake the second user input control responsive to an internal stimulus; and
   actuating only the second haptic actuator of the first and second haptic actuators in response to the wearer actuating the second user input control.

10. The method of claim 9, further comprising actuating the first user input control responsive to only external stimuli.

11. The method of claim 9, wherein a first gesture detected by an accelerometer sensor actuates the first user input control, and a second gesture detected by the accelerometer sensor actuates the second user input control.

12. The method of claim 9, further comprising actuating the second user input control responsive to only internal stimuli.

13. A tracking system, comprising:
a wearable tracking computer, comprising:
  a wearable housing;
  a first user input control;
  a second user input control;
  a processing unit disposed in the housing, the processing unit being configured to indicate first locations of the wearable housing when the wearer actuated the first user input control and second locations of the wearable housing when the wearer actuated the second user input control;
  interface circuitry disposed in the wearable housing, the interface circuitry being configured to communicate the first locations and the second locations to a client computer;
  a first haptic actuator disposed in the wearable housing and configured to haptically stimulate one of a radius bone or an ulna bone of a wearer responsive to actuation of the first user input control; and
  a second haptic actuator disposed in the wearable housing and configured to haptically stimulate another of the radius bone or the ulna bone of the wearer responsive to actuation of the second user input control,
  wherein only the first haptic actuator of the first and second haptic actuators is configured to actuate in response to the wearer actuating the first user input control,
  wherein only the second haptic actuator of the first and second haptic actuators is configured to actuate in response to the wearer actuating the second user input control,
  wherein the first and second user input controls are configured to be consciously activated by the wearer; and
a modeling computer, the modeling computer obtaining the first locations and the second locations.

14. The tracking system of claim 13, further comprising the client computer, the client computer displaying one or more portions of a location visual model generated based on the first locations and the second locations.

15. The tracking system of claim 13, wherein the modeling computer generates a location visual model based on the obtained first locations and second locations and provides information to the client computer that causes the client computer to display one or more portions of the location visual model.

16. The tracking system of claim 13, wherein the modeling computer generates a location data model based on the obtained first locations and second locations, generates a location visual model based on the generated location data model, and provides information to the client computer that causes the client computer to display one or more portions of the location visual model.

17. The tracking system of claim 13, wherein a first gesture detected by an accelerometer sensor actuates the first user input control, and a second gesture detected by the accelerometer sensor actuates the second user input control.

* * * * *